(12) United States Patent
Taylor et al.

(10) Patent No.: US 11,493,894 B2
(45) Date of Patent: Nov. 8, 2022

(54) AUTOMATION SYSTEM

(71) Applicant: LightFi Limited, Greater London (GB)

(72) Inventors: Matthew William Taylor, Greater London (GB); Alexey Olegovich Bak, Greater London (GB); Hemmel Amrania, Greater London (GB)

(73) Assignee: LightFi Limited, London (GB)

( * ) Notice: Subject to any disclaimer, the term of this patent is extended or adjusted under 35 U.S.C. 154(b) by 0 days.

(21) Appl. No.: 17/427,186

(22) PCT Filed: Jan. 23, 2020

(86) PCT No.: PCT/GB2020/050157
§ 371 (c)(1),
(2) Date: Jul. 30, 2021

(87) PCT Pub. No.: WO2020/157468
PCT Pub. Date: Aug. 6, 2020

(65) Prior Publication Data
US 2022/0043408 A1 Feb. 10, 2022

(30) Foreign Application Priority Data
Jan. 30, 2019 (GB) ..................... 1901292

(51) Int. Cl.
*G05B 15/02* (2006.01)
*H05B 47/115* (2020.01)
(Continued)

(52) U.S. Cl.
CPC .......... *G05B 15/02* (2013.01); *H04L 12/2827* (2013.01); *H05B 47/115* (2020.01); *H05B 47/19* (2020.01)

(58) Field of Classification Search
CPC ... G05B 15/02; H04L 12/2827; H05B 47/115; H05B 47/19; Y02B 20/40
See application file for complete search history.

(56) References Cited

U.S. PATENT DOCUMENTS 9,551,504 B2 1/2017 Arensmeier et al.
9,612,589 B1 4/2017 Dawson-Haggerty et al.
(Continued)

FOREIGN PATENT DOCUMENTS

CN 105869238 A 8/2016
GB 2553798 A 3/2018
WO 2012015404 A1 2/2012

OTHER PUBLICATIONS

Combined Search and Examination Report under Sections 17 and 18(3) dated Jul. 22, 2019 in GB Application No. 1901292.1.
(Continued)

*Primary Examiner* — Mohammad Ali
*Assistant Examiner* — Sheela Rao
(74) *Attorney, Agent, or Firm* — Occhiuti & Rohlicek LLP

(57) ABSTRACT

A building monitor for controlling an environment in a region of a building. The monitor is configured to couple to a building system and operable to change a state of a building system. The monitor comprises a processor and a receiver coupled to the processor. The receiver is configured to wirelessly detect the presence of one or more electronic device thereby to indicate an occupancy level of a region of a building. The processor is configured to receive an environmental signal indicative of an environmental condition in a region of a building. The monitor is configured to output a signal for controlling a state of a building system in dependence on the indicated occupancy level and/or the indicated environmental condition.

19 Claims, 11 Drawing Sheets

(51) Int. Cl.
*H05B 47/19* (2020.01)
*H04L 12/28* (2006.01)

(56) References Cited

U.S. PATENT DOCUMENTS

| | | | |
|---|---|---|---|
| 10,168,193 | B2 | 1/2019 | Jost |
| 2002/0194387 | A1 | 12/2002 | Defosse |
| 2003/0102979 | A1 | 6/2003 | Jednacz et al. |
| 2006/0202815 | A1 | 9/2006 | John |
| 2008/0133052 | A1 | 6/2008 | Jones et al. |
| 2008/0242313 | A1 | 10/2008 | Lee et al. |
| 2010/0145479 | A1 | 6/2010 | Griffiths |
| 2013/0157559 | A1 | 6/2013 | Flammer, III et al. |
| 2014/0031989 | A1 | 1/2014 | Bergman et al. |
| 2014/0107846 | A1 | 4/2014 | Li |
| 2014/0207282 | A1 | 7/2014 | Angle et al. |
| 2014/0347182 | A1 | 11/2014 | Poursohi et al. |
| 2015/0088272 | A1 | 3/2015 | Drew |
| 2015/0097958 | A1 | 4/2015 | Fadell et al. |
| 2015/0148965 | A1 | 5/2015 | Lemire et al. |
| 2015/0268205 | A1 | 9/2015 | Gettings et al. |
| 2015/0276238 | A1 | 10/2015 | Matsuoka et al. |
| 2016/0056629 | A1 | 2/2016 | Baker et al. |
| 2016/0127875 | A1 | 5/2016 | Zampini, II |
| 2017/0038787 | A1 | 2/2017 | Baker et al. |
| 2017/0089602 | A1 | 3/2017 | Lemire et al. |
| 2017/0308072 | A1 | 10/2017 | Arensmeier |
| 2018/0004178 | A1 | 1/2018 | Haines et al. |
| 2018/0027386 | A1 | 1/2018 | Zampini, II |
| 2018/0087795 | A1 | 3/2018 | Okita et al. |
| 2018/0292520 | A1* | 10/2018 | Bermudez .............. G08B 25/08 |
| 2018/0299154 | A1 | 10/2018 | Lemire et al. |
| 2019/0212722 | A1 | 7/2019 | Arensmeier |
| 2020/0183343 | A1 | 6/2020 | Amrania et al. |

OTHER PUBLICATIONS

Examination Report under Section 18(3) dated Apr. 2, 2020 in GB Application No. 1901292.1.
International Search Report and Written Opinion dated Mar. 23, 2020 in PCT Application No. PCT/GB2020/050157.
Combined Search and Examination Report under Sections 17 and 18(3) dated Feb. 17, 2017 in GB Application No. 1615636.6.
Indian Examination Report under Sections 12 & 13 dated Jun. 30, 2021 in IN Application No. 201927010946.
International Search Report and Written Opinion dated Nov. 23, 2017 in PCT Application No. PCT/GB2017/052702.
First Chinese Office Action dated Sep. 13, 2021 in CN Application No. 201780065636.6.

\* cited by examiner

AUTOMATION SYSTEM

CROSS-REFERENCE TO RELATED APPLICATIONS

This application is a national phase under 35 U.S.C. 371 of International Application No. PCT/GB2020/050157 filed on Jan. 23, 2020, which claims priority to British Application No. 1901292.1 filed on Jan. 30, 2019, the contents of all of which are hereby incorporated by reference in their entireties.

The present invention relates to an automation system, in particular to a building monitor for controlling an environment in a region of a building.

BACKGROUND

Increasingly, people are becoming conscious of energy usage in office environments. Lighting, heating, ventilation and cooling (HVAC) an office when people are not in the office unnecessarily wastes energy, which leads to wasted costs. It has been estimated that up to one third of people leave lights on unnecessarily when leaving a room. In the EU alone, lighting and HVAC left on unnecessarily in offices is believed to generate a €14 billion annual cost.

Attempts have been made to address this, by using timing systems and motion sensors. Motion sensors, such as passive infra-red motion sensors, are able to react to the motion of people entering offices, and turn lights, ventilation, heating and cooling on accordingly. However, these systems typically require a large number of sensors to be installed in an office to be able to sense movement throughout the office.

Timing systems can be used for lighting, ventilation heating and cooling controls, for example to turn ventilation systems on during set hours, for example 8 am to 6 pm. Such systems are not able to deal with people arriving early or leaving late, and so provide imprecise control. This can waste energy.

There is therefore a need to address drawbacks associated with current automated systems.

SUMMARY

According to an aspect of the present invention, there is provided a building monitor for controlling an environment in a region of a building, the monitor being configured to couple to a building system and operable to change a state of a building system, the monitor comprising:
  a processor, and
  a receiver coupled to the processor, the receiver being configured to wirelessly detect the presence of one or more electronic device thereby to indicate an occupancy level of a region of a building,
  the processor being configured to receive an environmental signal indicative of an environmental condition in a region of a building;
  the monitor being configured to output a signal for controlling a state of a building system in dependence on the indicated occupancy level and/or the indicated environmental condition.

The building monitor may be configured to determine a change in the indicated occupancy level, and to control a state of a building system in dependence on the determined change. The building monitor may be configured to determine a change in the indicated environmental condition, and to control a state of a building system in dependence on the determined change. The environmental signal may be indicative of a plurality of environmental conditions in a region of a building.

Where the indicated occupancy level is in a first occupancy band, and the indicated environmental condition is in a first environmental condition band, the monitor may be configured to control a state of a building system to be in a first building system state. Where the indicated occupancy level is in or changes to a second occupancy band, the monitor may be configured to control a state of a building system to be in a second building system state. Where the indicated environmental condition is in or changes to a second environmental condition band, the monitor may be configured to control a state of a building system to be in a third building system state.

The environmental signal may be indicative of air quality. The environmental signal may comprise an indication of whether a region of a building is in fluid communication with an external environment.

The one or more electronic device may be associated with a region of a building.

The receiver may be configured to wirelessly detect the presence of the one or more electronic device by observing a wireless signal. The wireless signal may be observed over a network to which the receiver does not belong.

The processor may be configured to output a control signal to a building system to cause a change in a state of a building system.

According to another aspect of the present invention, there is provided a method of controlling an environment in a region of a building, the method comprising:
  detecting the presence of one or more electronic device thereby to indicate an occupancy level of a region of a building;
  receiving an environmental signal indicative of an environmental condition in a region of a building; and
  controlling a state of a building system in dependence on the indicated occupancy level and/or the indicated environmental condition.

The method may comprise determining a change in the indicated occupancy level, and controlling a state of a building system in dependence on the determined change. The method may comprise determining a change in the indicated environmental condition, and controlling a state of a building system in dependence on the determined change. The environmental signal may be indicative of a plurality of environmental conditions in a region of a building.

Where the indicated occupancy level is in a first occupancy band, and the indicated environmental condition is in a first environmental condition band; the method may comprise controlling a state of a building system to be in a first building system state. Where the indicated occupancy level is in or changes to a second occupancy band, the method may comprise controlling a state of a building system to be in a second building system state. Where the indicated environmental condition is in or changes to a second environmental condition band, the method may comprise controlling a state of a building system to be in a third building system state.

The environmental signal may comprise an indication of whether a region of a building is in fluid communication with an external environment.

The receiver may be configured to wirelessly detect the presence of the one or more electronic device by observing a wireless signal. The wireless signal may be observed over a network to which the receiver does not belong.

According to another aspect of the present invention, there is provided a building monitor for controlling an environment in a region of a building, the monitor being configured to couple to a building system and operable to change a state of the building system, the monitor comprising:

a processor, and a receiver coupled to the processor, the receiver being configured to wirelessly detect the presence of one or more electronic device thereby to indicate an occupancy level of a region of a building, the processor being configured to determine a time-varying characteristic of the detected one or more electronic device;

the monitor being configured to output a signal for controlling a state of a building system in dependence on the indicated occupancy level and/or the determined time-varying characteristic.

According to another aspect of the present invention, there is provided a method of controlling an environment in a region of a building, the method comprising:

detecting the presence of one or more electronic device thereby to indicate an occupancy level of a region of a building;

determining a time-varying characteristic of the detected one or more electronic device;

controlling a state of a building system in dependence on the indicated occupancy level and/or the determined time-varying characteristic.

According to another aspect of the present invention, there is provided an occupancy detection system for detecting occupancy of a region of a building by an animal such as a human, the system comprising:

a processor; and a receiver coupled to the processor, the receiver being configured to observe a wireless signal thereby to detect the presence of one or more electronic device in a region of a building;

the processor being configured to:

determine whether the detected electronic device is indicative of occupancy; and determine an occupancy of a region of a building in dependence on that determination.

The processor may be configured to determine whether the detected electronic device is indicative of occupancy in dependence on header information forming at least a part of the wireless signal. The processor may be configured to determine whether the detected electronic device is indicative of occupancy in dependence on a source address of the signal. The processor may be configured to determine whether the detected electronic device is indicative of occupancy in dependence on a time-varying characteristic of the wireless signal.

The time-varying characteristic may comprise a received signal strength of the signal. The time-varying characteristic may comprise an activity level of the wireless signal. The time-varying characteristic may comprise a connectivity profile of the electronic device.

The receiver may be configured to observe the wireless signal over a network to which the receiver does not belong.

According to another aspect of the present invention, there is provided a method of detecting occupancy of a region of a building by an animal such as a human, the method comprising:

observing a wireless signal thereby to detect the presence of one or more electronic device in a region of a building;

determining whether the detected electronic device is indicative of occupancy; and determining an occupancy of a region of a building in dependence on that determination.

Determining whether the detected electronic device is indicative of occupancy may comprise reading header information forming at least a part of the wireless signal. The method may comprise determining whether the detected electronic device is indicative of occupancy in dependence on a source address of the signal. The method may comprise determining whether the detected electronic device is indicative of occupancy in dependence on a time-varying characteristic of the wireless signal.

The time-varying characteristic may comprise a received signal strength of the signal. The time-varying characteristic may comprise an activity level of the wireless signal. The time-varying characteristic may comprise a connectivity profile of the electronic device.

The method may comprise observing the wireless signal at a receiver over a network to which the receiver does not belong. According to another aspect of the present invention, there is provided computer readable code configured to perform a method as described herein when the code is run on a computer. According to another aspect of the present invention, there is provided apparatus configured to perform a method as described herein.

Any one or more feature of any aspect above may be combined with any one or more feature of that aspect and/or any other aspect above. Any apparatus feature may be written as a method feature where possible, and vice versa. These have not been written out in full here merely for the sake of brevity.

This Summary is provided to introduce a selection of concepts in a simplified form that are further described below in the Detailed Description. The mention of features in this Summary does not indicate that they are key features or essential features of the invention or of the claimed subject matter, nor is it to be taken as limiting the scope of the claimed subject matter.

BRIEF DESCRIPTION OF THE FIGURES

The present invention will now be described by way of example with reference to the accompanying drawings. In the drawings.

DETAILED DESCRIPTION

Figure 1:
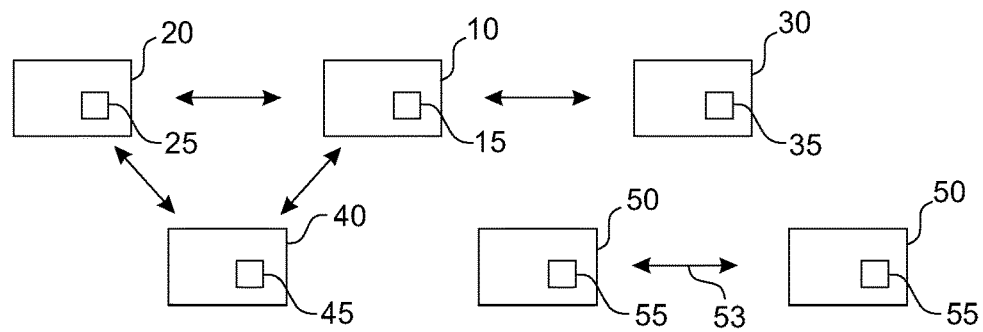
FIG. 1 schematically illustrates an arrangement of electronic devices including a monitor.

A building system interacts with devices associated with a building. The building is in some examples a commercial building, such as an office. Such building devices suitably include many different types of device, for example a light fitting, a heating system or a controller for the heating system, and an air conditioning unit or a controller for the air conditioning unit. The building device can comprise a HVAC (heating, ventilating, air conditioning) device. In general, the building device can comprise any powered device or system. A building device is conveniently a device forming part of the building's infrastructure. A building device may, for example, provide any one or more of lighting, heating, cooling, ventilation and access (as in the case of a door lock or lift/elevator controller).

The building devices have several states. In a simple case, a building device can have an ON state and an OFF state. In other cases, there may be other possible states. For example, a light fitting suitably has one or more dimmed state in addition to its ON and OFF states. A heating system, or a controller for the heating system, suitably has additional states corresponding to different temperature settings, for example a daytime setting of, say, 20 degrees Celsius, and a night-time setting of, say, 14 degrees Celsius. Similarly, an air conditioning unit, or a controller for the air conditioning unit, suitably has additional states corresponding to different temperature settings.

A ventilation system can have different states in which the speed of a fan in the ventilation system can differ. The ventilation system can have different states in which, where there are a plurality of fans, different numbers or proportions of fans can operate. For example, one third of the fans might be on, and two thirds of the fans might be off. The fans might be operable at a low, medium or high speed. The speed at which a fan is operable may be expressed as a percentage of a pre-determined maximum for that fan. The higher the fan speed, or the higher the proportion of fans operating, the higher the relative power level.

The various states of the building devices suitably correspond to differing power levels or power states of the building devices. As a result, switching from a state with a higher power level to a state with a lower power level, such as dimming a light or turning down a heating system, can save energy.

The building system has a state which suitably depends on the state of at least one building device. For example, the state of the building system can comprise the states of each of the building devices that may be present in the building.

The building devices can affect the environment of the building. For example, a light fitting can be turned on or off (or dimmed) to illuminate a region of the building adjacent the light fitting. A heating or air conditioning unit can be turned on or off to heat or cool a region of the building adjacent the heating or air conditioning unit.

Figure 7:
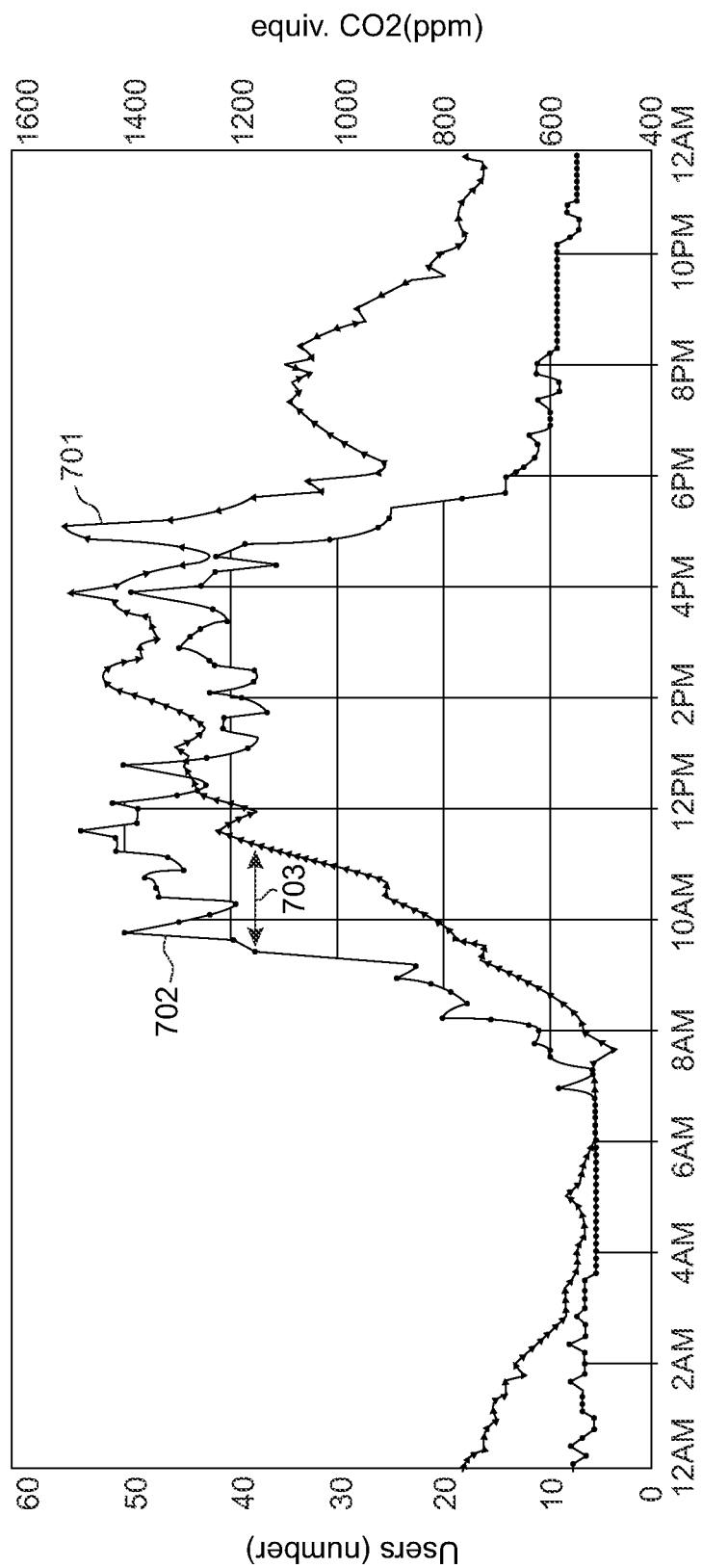
FIG. 7 illustrates variation of $CO_2$ level for an occupied space.

A ventilation system can affect the air quality in a region of a building that is served by that ventilation system. The air quality is suitably an indoor air quality. Air flow rate can be controlled by the ventilation system, as well as the temperature of airflow into the region (e.g. a room). Where people are present in a room, the air quality can diminish over time. For example, the carbon dioxide ($CO_2$) levels in a room or other such confined space will typically increase over time. Inadequate ventilation can quickly lead to high indoor $CO_2$ levels. An example of this is illustrated in FIG. 7. $CO_2$ levels over about 1400 ppm can have deleterious effects on the health and/or productivity of those in the room. For example, levels of $CO_2$ above about 1400 ppm have been shown to reduce a person's cognitive ability by up to 50%, and consequently reduce a person's productivity by 8-11%. Further, studies have shown that high $CO_2$ levels can reduce concentration by up to 50%. Similarly, volatile organic compounds (VOCs) can build up in a confined space and may have adverse health effects. It is therefore desirable to manage the air quality in a room, such as the $CO_2$ levels and/or the VOC levels.

Figure 8:
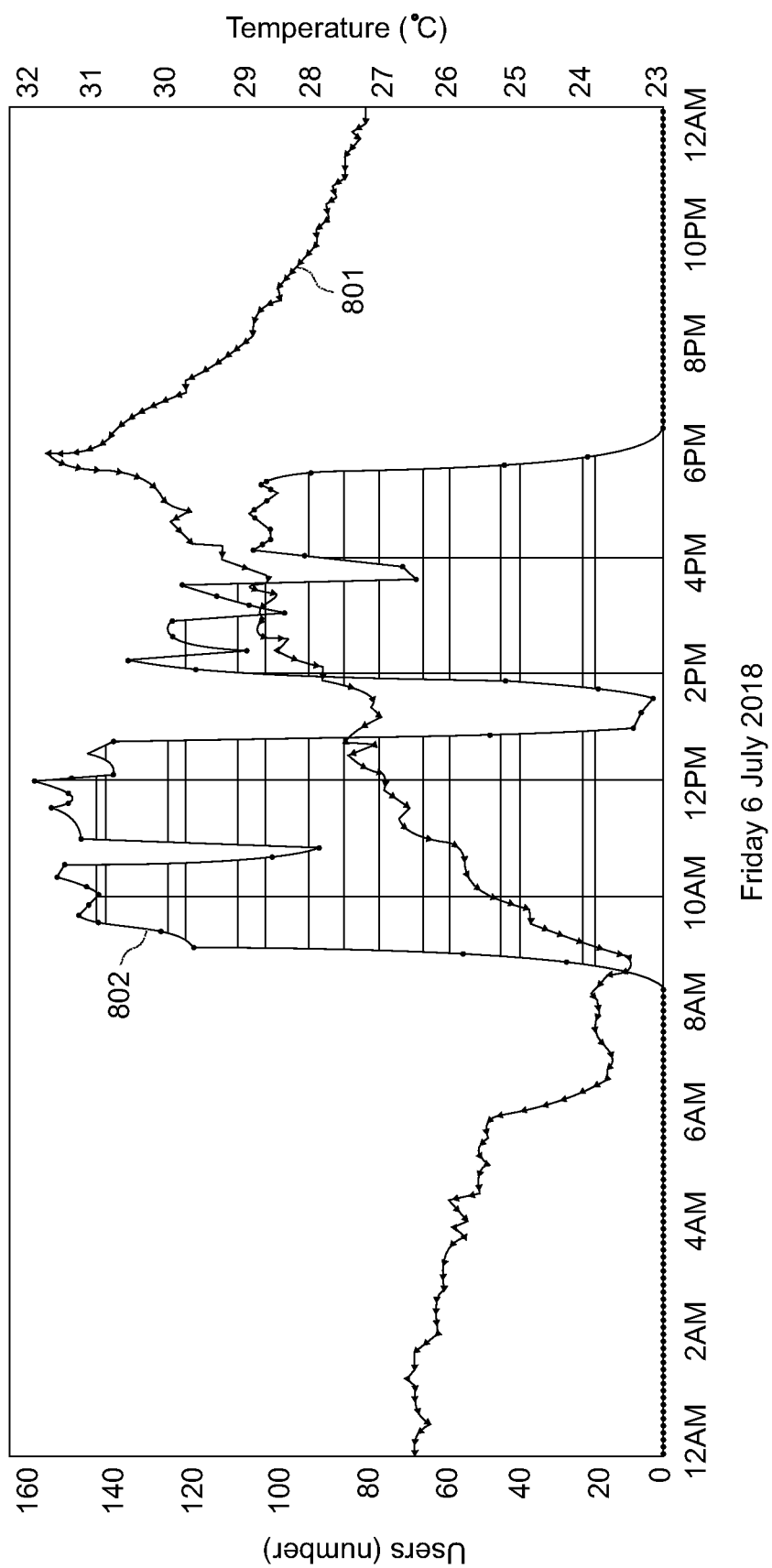
FIG. 8 illustrates variation of temperature for an occupied space.

Reductions in measured air quality, for example indoor air quality in the region of the building, (for example an increase in $CO_2$ and/or VOC levels) can lag behind occupancy levels. For example, as illustrated in FIG. 7, the measured build-up of $CO_2$ 701 lags the occupancy 702 of a space by approximately 2 hours (indicated at 703). Similarly, referring to FIG. 8, the temperature 801 in a room can lag behind the occupancy 802 in the room. In each case, the lag can be due to an accumulation of $CO_2$ or heat, respectively, given off by people in the room. The lag can be due to gas diffusion effects and sensor placement in the region (sensors may typically be located on a wall) or sensor placement in an exhaust vent leading from the region (i.e. the sensor may not even be located in the region of the building).

The building devices, examples of which are given above, may be present within the building, or in a region of the building, optionally including its curtilage, all the time. The devices may be built into the building: for example, partially or wholly embedded in structures of the building such as walls, floors or ceilings. For example, a light fitting or HVAC system such as a ventilation fan is suitably embedded in the building structure, such as in the ceiling. As another example, a heating system is suitably integrated within the building. Alternatively, a light fitting such as a desk lamp or free-standing floor lamp, or an appliance such as a desk fan, may be portable, and may therefore not necessarily be within the building, or in a region of the building, i.e. near to the building, all the time.

In general, the building devices are devices which have a state that can be controlled. In other words, the building devices have a state that can be altered, such as by turning the device on or off or varying the intensity of operation of the device (for example fan speed). Changing the state of the building device may be effected by circuitry within the building device itself such as a power circuit, or by circuitry in a power source (e.g. a power socket) from which the building device obtains power. This latter approach is particularly useful for plug-in appliances such as a desk fan or lamp. Changing the state of the building device alters the amount of energy that that building device consumes. Thus it is desirable to maintain the building devices in a relatively lower energy state when the building devices are not needed, for example when they are not being used. This can result in energy savings. Further, changing the state of a building device can affect the environment and therefore the thermal comfort, health and wellbeing of people in the building. It is possible to use the techniques described herein to determine a measure of health, for example based on a product of the number of people in a room and the time spent in that room when the air quality is indicated to be poor (for example greater than 1000 ppm $CO_2$). Such a measure of health can be used to determine an order of control for a building system—for example regions in which the measure of health indicates poorer health can be prioritised. Similarly, a measure of comfort, for example based on a number of people in a room and whether temperature and/or humidity are within a certain range, can be determined. Such a measure of comfort can be used to determine an order of control for a building system—for example regions in which the measure of comfort indicates worse comfort can be prioritised.

In addition to the building devices, there are suitably devices, such as electronic devices that are associated with use of the building. Such electronic devices associated with use of the building can include portable devices such as mobile telephones, personal digital assistants (PDAs), tablet computers, laptops and wearable devices such as watches and activity monitors, and non-portable devices such as printers, fixed line telephones and desktop computers. Activity of such electronic devices can be used to determine whether the building, or region of the building, is in use. This determination can be used to change the state of one or more of the building devices. In this way, the building devices can be moved to, or kept in, relatively lower energy states when it is appropriate to do so. For example, when a region of a building is not in use, lights can be turned off, ventilation can be reduced to a lower flow rate or turned off, and/or other powered devices can be powered down or put into standby or sleep modes of operation. The building devices can be moved to, or kept in, relatively higher energy states when it is appropriate to do so. For example, when a region of a building is in use, lights can be turned on, ventilation can be turned on or increased to a higher flow rate, and/or other powered devices can be powered up or put into active modes of operation. In some examples, when a region of a building is in use, ventilation can be turned on to its maximum extent, to keep the indoor air quality at a desired level when the building is in high use.

This changing of the state of the building devices (and therefore of the building system) permits a reduction or minimisation in the energy usage, and can further permit an improvement in indoor air quality and people's health and wellbeing. This can be achieved as a result of lowering the energy usage of building devices when they are not needed. This can be done whilst maintaining the building devices in an appropriate state when they might be needed. Thus a person in the region under control is not inconvenienced by an inability to use building devices when desired.

The electronic devices associated with use of the building can indicate use of the building by various means. For example, a portable device such as a mobile telephone will usually be carried by a person. The portable device may be connectable to a building network or a local network, such as a wireless network, for example a Wi-Fi network. Where the mobile telephone is detected in a region of the building it can be used to indicate that a person is also in the region of the building, and that therefore the region of the building is in use. In another example, a fixed line telephone with a cordless handset may remain within a region of a building so the presence of the fixed line telephone is not sufficient on its own to determine use of the building. Instead, an activity level of the telephone can be assessed to determine use of the building. For example, if the phone is being used to make or receive a call it can indicate that a person is using the telephone and therefore that that region of the building is in use.

The presence and/or activity of the electronic devices associated with use of the building can be used in the control of the building devices. In other words, where an electronic device in a region of a building indicates that the region of the building is in use, lights can be turned (or kept) on, and/or power can be provided (or maintained) to heating, cooling and/or ventilation systems. For example, ventilation fans can be turned up or turned (or kept) on. Where an electronic device in a region of a building indicates that the region of the building is not in use, lights can be turned (or kept) off, and/or power to heating, cooling and/or ventilation systems can be reduced (or kept in a reduced state). For example, ventilation fans can be turned down or turned (or kept) off.

A building monitor (or building system controller) can monitor and optionally effect control of the environment in the region of the building. The building monitor is suitably able to detect and/or analyse one or more electronic device and its activity level. The building monitor is suitably able to detect and/or analyse an environmental signal. The environmental signal can be indicative of an environmental condition in a region of the building Suitably, the building monitor is configured to receive the environmental signal. The building monitor is suitably configured to effect a change in the state of the building system, for example in response to the detection and/or analysis of the one or more electronic device and/or the environmental signal. The building monitor is suitably configured to output a signal in dependence on one or more of the detected and/or analysed one or more electronic device and the environmental signal. The building monitor is suitably configured to output a signal indicative of one or more of the detected and/or analysed one or more electronic device and the environmental signal. The signal output by the building monitor can in some examples be used to effect a change in the state of the building system so as to effect control of the environment in the region of the building. The signal output by the building monitor may comprise an indication of the desired change to effect, for example turning a fan on or off, increasing or decreasing the fan speed, increasing or decreasing the temperature, and so on. The signal can comprise a control signal for effecting control of the state of the building system. The signal can comprise a control signal for effecting control of the environment in the region of the building. The signal can effect real-time control of a building device.

In some examples, the signal can have a range of 4-20 mA current and a range of 0-10V voltage. The signal can indicate an occupancy level and/or other desired parameters. The signal can indicate a percentage intensity at which a building device is desired to operate (for example a 5V signal might indicate that a fan is to run at 50% speed).

The signal can be output directly from the monitor to a building device to effect control of that building device. The signal can be output from the monitor to a building system controller which, in response to the received signal, can effect control of the building device. The monitor is, in some examples, configured to send a converted signal to a separate module (such as a Bluetooth module), which module is configured to send the signal to one of the building device and the building system controller.

FIG. 1 shows a schematic illustration of devices in a region of a building. A wireless network access point 10 is present in a region of a building. The access point is always present in the building. The access point 10 is able to communicate over a first wireless network using a first protocol. The access point 10 comprises a transceiver 15 to enable it to communicate using the first protocol. Whilst only a transceiver is illustrated in FIG. 1, the access point 10 may additionally or alternatively comprise a transmitter and a receiver via which it can communicate. A first device 20 is able to communicate over the first wireless network using the first protocol. The first device 20 communicates with the access point 10. The first device 20 comprises a transceiver 25 to enable it to communicate using the first protocol.

A second device 30 is able to communicate over the first wireless network using the first protocol. The second device 30 comprises a transceiver 35 to enable it to communicate using the first protocol. A third device 40 is able to communicate over the first wireless network using the first protocol. The third device 40 comprises a transceiver 45 to enable it to communicate using the first protocol. Whilst the first device 20, the second device 30 and the third device 40 are illustrated in FIG. 1 as each comprising a transceiver 25, 35, 45, any one or more of the first device 20, the second device 30 and the third device 40 may additionally or alternatively comprise a transmitter and a receiver.

In one example the first protocol is Wi-Fi and the first network is a Wi-Fi network. The access point 10 is, in this example, a Wi-Fi router. As illustrated by the arrows in FIG. 1 between the access point 10 and each of the first device 20, the second device 30 and the third device 40, each device can communicate directly with the access point 10. It is also possible for the devices to communicate with one another without communicating with the access point 10. For example, as illustrated by the arrow between the first device 20 and the third device 40, the first device 20 can communicate directly with the third device 40.

The access point may also be capable of communicating over a second wireless network using a second protocol different to the first protocol. Any one or more of the first device 20, the second device 30 and the third device 40 may communicate with the access point 10 over the second network using the second protocol as well as or instead of over the first network using the first protocol. The devices may communicate with one another over the second network using the second protocol as well as or instead of over the first network using the first protocol.

The access point 10, the first device 20, the second device 30 and the third device 40 comprise a transceiver enabling communications over the network and protocol used by that device. In other words, where the access point 10, the first device 20, the second device 30 and/or the third device 40 communicate using the first protocol, the respective transceiver 15, 25, 35, 45 is operable to transmit and receive signals using the first protocol. Where the access point 10, the first device 20, the second device 30 and/or the third device 40 communicate using the second protocol, the respective transceiver 15, 25, 35, 45 is operable to transmit and receive signals using the second protocol. Where the access point 10, the first device 20, the second device 30 and/or the third device 40 communicate using both the first protocol and the second protocol, the respective transceiver 15, 25, 35, 45 comprises a first transceiver portion operable to transmit and receive signals using the first protocol and a second transceiver portion operable to transmit and receive signals using the second protocol. The electronic devices may be configured to communicate over additional protocols and/or additional networks.

In the example above, where the first protocol is Wi-Fi, the second protocol may be Bluetooth. Alternatively or additionally the first protocol and the second protocol may be the same protocol. In this example, both the first protocol and the second protocol are packet-based protocols. In one configuration, the access point 10 communicates with the first device 20, the second device 30 and the third device 40 over Wi-Fi, and the first device 20 and the second device 30 communicate with each other over Bluetooth. Any other convenient configuration is possible.

A monitor 50, such as a building monitor, is able to observe communications over the first network and/or over the second network. In other words, the monitor 50 is able to observe communications or signals sent using the first protocol and/or the second protocol. Where electronic devices are operable to communicate over additional networks and/or protocols, the monitor 50 is suitably able to observe communications or signals sent over the additional networks and/or using the additional protocols.

The monitor 50 comprises a transceiver 55. Instead of or in addition to the transceiver 55, the monitor may comprise a receiver. The monitor may additionally comprise a transmitter. The transceiver 55 is operable to receive signals sent over the first and/or second networks. The transceiver 55 is operable to receive signals sent using the first and/or second protocols.

One or more monitor may be provided. In FIG. 1, two monitors 50 are illustrated. In some examples, as illustrated in FIG. 1, the monitors can communicate with one another (illustrated by arrow 53). More than two monitors can be provided in other examples. A monitor may be configured to communicate with a nearest-neighbour other monitor. The monitor with which to communicate may be determined in dependence on a location of the monitor and of the other monitor and/or on a determined loss over a signal path between the monitor and the other monitor.

Figure 2:
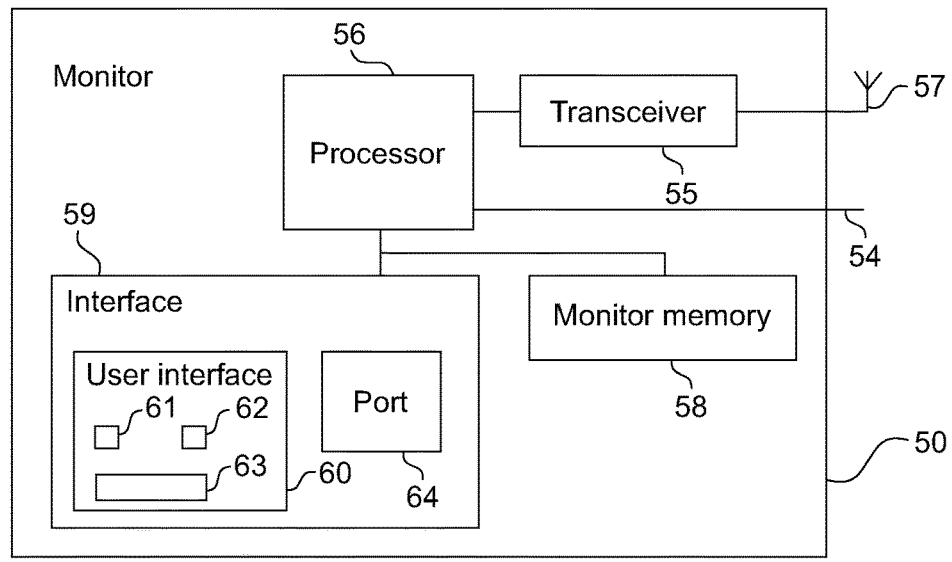
FIG. 2 schematically illustrates the monitor in more detail.

An example of a monitor 50 is schematically illustrated in FIG. 2. The monitor 50 comprises a processor 56 coupled to the transceiver 55. Where the monitor 50 comprises a receiver, and optionally also a transmitter, instead of or as well as the transceiver 55, the receiver, and optionally also the transmitter, is suitably coupled to the processor 56. The monitor 50 comprises an aerial 57 which is coupled to the transceiver 55 for receiving and/or transmitting wireless signals. The monitor 50 comprises a monitor memory 58 coupled to the processor 56. The monitor 50 comprises an interface 59 coupled to the processor 56. In this example, the interface 59 comprises a user interface 60 though it need not in all examples. The user interface comprises two buttons or controls 61, 62 and a display 63. The user interface 60 permits user interaction with the monitor 50. Any suitable number and combination of buttons and/or displays is possible. The display may comprise one or more indicator, such as an LED. The interface 59 comprises a port 64. The port 64 permits connection of the monitor 50 to a computer peripheral, for example a computer or memory device such as a flash drive. The port may, for example, comprise a USB port, a firewire port, a serial port such as an RS-232 port, a network port such as an Ethernet port, or any other suitable port. Additionally or alternatively the transceiver 55 and/or another transceiver may provide a wireless connection between the monitor and another computer device. The interface 59 may comprise the other transceiver. Suitably the interface 59 comprises a network-based interface such as a web-based interface, for example a web server. This permits communication over a network connection. The network connection may be a wired connection, via the port 64, and/or a wireless connection, via the transceiver 55 or the other transceiver. The web-based interface permits configuration of the monitor both locally and remotely, for example via a web portal and/or mobile application.

The monitor 50 is configured to listen to communications over the first and/or second protocols. The monitor 50 can detect signals sent over these protocols, even if the monitor 50 is not authorised to be part of the respective network. The monitor 50 need not be part of a network to observe or acquire signals sent within, or propagating through, that network.

The monitor is able to see all packets sent to any hardware address (on the frequency (or frequency range(s)) and/or channel that the monitor 50 is configured to observe). Wireless packets such as Wi-Fi packets are sent through the air so are observable as long as the monitor 50 is in range of those wireless packets and configured to observe on the correct radio frequency or frequencies.

A device driver such as a Wi-Fi device driver may ignore wireless packets that it receives that do not specify the address such as the hardware, or MAC, address of that device as a destination of the packet, i.e. the device driver may ignore packets that are not directed to its own address. There is a mode of operation of a device driver in which all packets are allowed to be passed forward from the device regardless of the address. This mode can be called 'promiscuous' mode, or 'monitor' mode (particularly in relation to a Wi-Fi device driver).

In one example, the monitor 50 comprises a Wi-Fi module operable in monitor mode. Not all available Wi-Fi modules support monitor mode, as it is not typically used for activities outside of network debugging. Thus the monitor 50 suitably comprises a Wi-Fi module that supports monitor mode. This permits the monitor 50 to observe Wi-Fi packets from any device on the same Wi-Fi channel. More generally, this approach permits the monitor 50 to observe signals such as Wi-Fi packets from any device that is transmitting in the frequency range that the monitor is configured to observe.

Data contents of encrypted packets, or frames, if any, such as might be present on a secured Wi-Fi network are not visible without the network password or decryption key. On a secured Wi-Fi network, the packet headers typically contain unencrypted information including the name of the Wi-Fi network (which might comprise a service set identifier, or SSID, or a basic service set identifier, or BSSID), the hardware (media access control, or MAC) address of the device from which the packet was sent, for example a Wi-Fi client or a Wi-Fi access point, the hardware (MAC) address of the intended recipient of the packet, for example a Wi-Fi client or a Wi-Fi access point, the signal level of the received packet (according to the receiving module) and various other information related to the setup and capabilities of the wireless network. The received signal strength may be added to, or associated with, the packet, or frame, for example by being added to the header. In one example, the signal strength is added to a RadioTap header by the receiving or observing device. Unencrypted packets, or frames, typically comprise packet headers comprising similar information. In general, the monitor 50 suitably comprises a hardware and/or a software radio that permits observation (i.e. receipt or reading) of wireless signals and reading of the unencrypted addresses and/or other network information. Data contents of the packets, or frames, i.e. encrypted data, need not be read or decrypted.

The monitor 50 is configured to determine the presence and/or number of devices, such as active clients (i.e. client devices that are active on the network), on a particular network in dependence on this information. This can be achieved without needing to have the password or decryption key for that network. Thus the monitor 50 can be configured to control devices associated with the building, such as one or more of lights, HVAC systems and other powered devices or appliances, accordingly.

The monitor need not obtain the address information in all examples. The monitor 50 may be configured to determine the presence and/or number of devices, or to obtain an approximate indication of the presence and/or number of devices, in dependence on an amount of radio activity in an appropriate, for example a selected, frequency range. For a relatively longer-range protocol, such as Wi-Fi, compared to, for example Bluetooth, the network may contain a lot of noise from other networks, which may make it more difficult to determine differences between master and client devices. For a shorter-range protocol, such as Bluetooth, a determination based on the radio activity may be sufficient. In more general terms, where the monitor 50 is arranged to determine the presence of devices and/or the number of devices in a region of a building, the monitor can be configured to make this determination on the basis of radio activity in a predetermined frequency range. This may be appropriate where the distance range of the protocol being used is within, or at least substantially within, the region of the building of interest. In other words, if a region of interest extends around a monitor for approximately 20 metres in each direction, then observing signals using a protocol with a distance range of 20 metres or less can provide sufficient information to be able to determine the presence of devices in that region. Thus, this technique can be used with protocols having longer-distance ranges where the regions of interest are correspondingly larger. In some examples, a plurality of monitors spaced from one another, and preferably in communication with one another, can be used to extend the region of interest for a given protocol (e.g. with a given range).

Suitably the monitor 50 is configured to observe signals sent to the access point 10. Typically the monitor 50 will be located at a given location in a building, and will not be constantly moved around the building. Signals transmitted from the access point 10 (which is also likely to be located in one place and not moved around the building) will therefore usually be observed by the monitor 50 at a relatively constant received signal strength.

In contrast, signals sent from other devices, which might move relative to the monitor 50, are likely to be observed with varying received signal strengths. Thus preferentially observing signals transmitted to the access point 10 permits the monitor 50 to obtain additional information regarding potential movement of the communicating devices. This can permit a greater level of filtering of the signals, or additional analysis of the signals.

Suitably the monitor 50 is located adjacent, or in the proximity of, the access point. This can assist in ensuring that the monitor 50 is within range of devices that are able to communicate with the access point.

The monitor 50 is suitably configured to observe signals that have a valid transmitter address, i.e. the transmitter or source address is present in the signal, and not blank. The monitor 50 is suitably configured, on observing the signal, to record the transmitter address, the received signal strength, the time the signal was received and/or the network over which the signal was transmitted (for example the hardware address of the access point to which the signal was transmitted or the BSSID/SSID). The monitor 50 suitably stores this information in the monitor memory 58. In some examples, the monitor can observe signals and/or record data irrespective of the transmitter address.

Where the first device 20 transmits a wireless signal to the access point 10, the monitor 50 can observe at least a part of this signal. That is to say, the first device 20 may transmit a burst (or a plurality) of packets and the monitor 50 can observe at least one of those packets. The signal will typically comprise routing information, such as a destination and/or source address. Here the destination address will be that of the access point 10 and the source address will be that of the first device 20. The signal suitably comprises a header, and the header comprises the routing information. The signal will also typically comprise payload data, which may be encrypted. Decryption of the payload is not necessary in the present techniques.

The monitor 50 is therefore able to observe the signal and to analyse the observed signal to determine information therefrom. The determined information comprises one or more of the destination address of the signal, the source address of the signal, the signal strength of the signal observed by the monitor 50, the name of the network over which the signal is sent, or BSSID/SSID, and the hardware address of the access point to which the signal is sent.

By observing a packet-based signal over a period of time, the monitor 50 is also able to determine the number of packets of that signal observed in a predetermined period of time, or the rate of observed packets, and how that rate varies with time. This can be in addition to the signal strength of each observed packet.

As described above, the monitor need not be authorised to join a network to be able to observe signals propagating through that network. As such, the destination address of the signals will not in this example be that of the monitor 50 (since the signals are being sent to another device, such as the access point 10 or the first device 20). Accordingly, the observance of the signals by the monitor is incidental to the signals themselves. That is to say, the observance of the signal by the monitor is incidental to the purpose of the signal as transmitted (which is to be received by the device specified in the destination address of the signal). The signals may be beacon signals. For example, the access point 10 (or another of the devices) may broadcast beacon signals to identify itself and provide information regarding the availability of the network. The monitor 50 is suitably also able to incidentally observe such signals. The monitor 50 observes the signals not necessarily for the purpose of joining the network or establishing communications with the access point 10, and so the observance of the signals can be said to be incidental in this case too.

In other words, the monitor 50 is not on the logical communication path intended for the signals when transmitted. Nevertheless, the monitor 50 is able to detect or observe the signals and to determine from the detected or observed signal, information pertaining to the signal.

Thus, in addition to the monitor there may be a transmitter and a receiver. The transmitter and the receiver may be capable of establishing a logical channel between them for conveying data from the transmitter to the receiver. The monitor may not be (or need not be) part of that logical channel but may be within range of the transmitter so that it can receive signals transmitted by the transmitter and intended for reception by the receiver. In this way the monitor may incidentally observe the signals from the transmitter to the receiver.

The monitor 50 is able to determine, from the information obtained from the signal, whether a control criterion is satisfied. The control criterion is suitably a predetermined control criterion. For example, the control criterion may be pre-set and/or adjustable by a user, and/or adjustable in dependence on information obtained from previous signals. The control criterion may be generated (or modified) by machine learning algorithms trained on information obtained from previous signals, or trained in some other way, for example using a training dataset. The machine learning algorithms might use quantisation such as vector quantisation. The machine learning algorithms might use cluster analysis. The machine learning algorithms might use k-means cluster analysis. The control criterion is such that satisfying the control criterion indicates a change in the use of the region of the building.

In a system where the monitor 50 is configured to determine occupancy or use of a building, or region of a building, the monitor 50 may obtain, from the signal, information which can indicate the occupancy or use. This information can be compared to a control criterion (or some combination of control criteria, enabling more selective determination of building use) to determine whether the region of the building is in use.

For example, a person may carry a mobile telephone into a region of a building. The mobile telephone can connect to a building Wi-Fi network (and/or can transmit Bluetooth signals). The monitor can observe a signal sent between the Wi-Fi network access point and the mobile telephone (and/or can observe transmitted Bluetooth signals). Where the control criterion is that a signal is observed, the monitor 50 can determine that the region of the building is in use on the basis of the observed signal. The monitor can accordingly control a building device (for example by outputting a signal as described herein) as a result of determining that the building is in use, such as turning the building device on.

The monitor 50 may be configured to observe on the building Wi-Fi network and/or on a Bluetooth frequency. The monitor is suitably configured to determine a period of time for which no signal has been observed. Where the control criterion is that no signal is observed for a predetermined period of time, the monitor can determine that the region of the building is not in use on the basis of not having observed a signal for the predetermined period of time. The monitor can accordingly control a building device as a result of the determination (for example by outputting a signal as described herein), such as turning the building device off or otherwise reducing its power usage.

In some examples, the signals are beacon signals which will not comprise a destination address. For example, Bluetooth devices can transmit packets with a destination address field that may be empty. Such packets may be called advertising packets. Such packets are not intended for a specific address. Such packets can be received and/or processed at all addresses that are listening for them. There is no need for Bluetooth packets to be sent to a particular access point. In some examples, Wi-Fi packets can be transmitted with a destination address field that may be empty. The signals will comprise at least one of a source address, a network name or other information identifying the network, a device name or other information identifying the transmitting device. The monitor 50 is, in some examples, configured to use this information to discriminate between observed signals. For example, the monitor 50 may be within the range of two Wi-Fi access points, one of which, the access point 10, is within the region of the building of interest to the monitor. The other of which, an external access point, is external to the region of interest. The monitor 50 therefore suitably does not take into account signals from the external access point in determining the use of the region of interest. Where both access points transmit beacon signals, the monitor can discriminate between the access points on the basis of an observed or determined source address or network name (assuming that the access points are on different networks). This enables the monitor to determine changes in the transmission of beacon signals from the access point 10, irrespective of the transmission of beacon signals from the external access point.

Further, the access point 10 may transmit signals to the devices with which it is communicating. In this instance, the monitor 50 does not need to consider these signals (as it is here only considering beacon signals), so it may distinguish the signals of interest (the beacon signals) on the basis of an empty destination field. It may ignore signals which have a non-empty destination field.

In some examples, the control criterion can be related to the destination address of a signal. For instance, where one or more device is communicating with the access point 10, signals from this device, or devices, will comprise the address of the access point 10 as the destination address. The source address, where present, may therefore differ depending on which device originated the observed signal. The control criterion may therefore include that the destination address of an observed signal matches a predetermined destination address. This will enable the monitor 50 to distinguish any signals sent to the access point 10. This permits determination of the amount of traffic, or the number of signals, sent to the access point 10. This can be indicative of the number of active devices in the region of interest, and so of the use of that region.

More generally, the monitor can be configured to observe signals, such as packet-based signals. The monitor can be configured to determine one or more of the received signal strength of the observed signals, the number of observed packets, the number of packets specifying a particular destination (including a blank destination), the number of packets from a particular device, the number of packets on a particular network, and the time of observation of one or more packet. The monitor can be configured to determine one or more of an absolute signal level of all observed packets, a mean signal level of all observed packets, a standard deviation of the signal level of observed packets (or another metric for analysing the distribution and/or variation in the observed packets). The monitor can be configured to determine whether packets are observed in successive time periods, and/or a variation in the signal strength (for example a mean signal strength) of observed packets from one time period to the next time period. A variation in signal strength from one time period to the next can be indicative of an electronic device that is moving relative to the monitor, for example a device entering the region of interest, leaving the region of interest, or moving through the region of interest. The monitor can be configured to use machine learning techniques in analysing the observed packets or data associated with the observed packets. The machine learning techniques can include pattern analysis using clustering, for example k-means cluster analysis. The machine learning techniques can include using a machine learning model trained with signal profile patterns of known device types. This can help discriminate between, for example, mobile telephones, laptop computers, tablet computers and so on.

There may be cases where there exist devices that are always present in the region of the building of interest. In these cases, it may be desirable to exclude signals sent from such devices when determining use of the building. For example, referring to FIG. 1, the second device 30 may be a printer. The printer can wirelessly communicate with the access point 10. In some instances the printer may periodically communicate with the access point 10 even when idle. In other instances the printer may be enabled to allow remote printing, in which case communications between the access point 10 and the printer do not necessarily indicate that the building is in use. Signals sent from the printer to the access point 10 will include the address of the access point 10 as the destination address of the signal. They will, at least in some cases, also include the source address of the printer. Thus these signals can be distinguished from those from other devices, such as the first device 20. The monitor 50 is therefore able to filter out these signals by determining that the source address is either not on a list of devices of interest, and/or by determining that the source address is on a list of devices to ignore.

In the case of printers and other such peripherals which can be expected to be consistently present in the building irrespective of use of the building, it is possible to determine the source address of the printer, or a range of source addresses of multiple printers and/or other peripherals. This can be determined by scanning the source addresses. This can also be determined based on information obtained from a manufacturer. For example, where a given manufacturer manufactures printers and/or other peripherals, but does not manufacture any device of interest to the monitor 50, a range of source addresses particular to that manufacturer can be determined. The source addresses can also be entered by a user, for example via the web-interface. Thus the list of source addresses is user-configurable. These source addresses that are determined to be for devices that are not of interest can be stored, and any signals with source addresses corresponding to the stored addresses can be ignored. Similarly, signals transmitted from the access point 10 to such stored addresses can also be ignored. This approach permits efficient selectivity of signals for further analysis.

Another way to identify devices whose activity or presence should be ignored in detecting building activity is to identify devices that are continually detected as being present over an extended period of time: for example for a period of a length greater than 8 hours, 12 hours, 24 hours or greater than 48 hours.

The above discussion relates to a list of source addresses to be ignored by the monitor (a 'negative list of source addresses'). There may also be a list of source addresses that the monitor does not ignore, for example those relating to devices of interest to the monitor 50 (a 'positive list of source addresses'). Either or both of such lists may be referred to by the monitor. Either or both of such lists are suitably stored. The lists can be stored locally to the monitor. The lists can be stored remotely from the monitor, and the monitor can be configured to access the stored list over a communication path, such as a wired or wireless communication path.

Devices can be added to a 'positive' list by an action of a user, such as running an application on a mobile device, or moving the device closer to the monitor whilst, say, pressing a button on the monitor (so that, for example, the monitor can determine the device based on received signal strength of signals from the device). The application might be configured to output a predetermined pattern (e.g. of signal power and/or timing) which is recognisable by the monitor.

An occupancy detection system can detect occupancy of a region of a building, for example by an animal such as a human. The occupancy can be or can comprise an occupancy level, for example the number of people present, or the percentage of a maximum capacity present. The system comprises a processor and a receiver coupled to the processor. The receiver is configured to observe a wireless signal thereby to detect the presence of one or more electronic device in a region of a building. The processor is configured to determine whether the detected electronic device is indicative of occupancy (e.g. whether that detected electronic device indicates the presence of a person) and determine an occupancy of the region of the building in dependence on that determination. Determining whether or not a detected electronic device is indicative of occupancy enables the system to determine a more accurate estimate of the occupancy of the region of the building. Devices that do not indicate occupancy can be ignored or discounted.

The processor may be configured to determine whether the detected electronic device is indicative of occupancy in dependence on header information forming at least a part of the wireless signal. Information in the header can enable the processor to categorise the electronic device, for example whether the device is emitting signals directed towards a particular destination address, such as a Wi-Fi router or network access point, or from a particular source address, such as a device on a list of known devices. The processor may be configured to categorise the electronic device in dependence on one or more of the frequency band of the signal (or frequency bands of the signals) emitted, whether a destination address is present in the signal or signals, and so on.

The processor may be configured to determine whether the detected electronic device is indicative of occupancy in dependence on a source address of the signal. The header information may indicate a source address of the wireless signal, for example the header information may comprise the source address. The header information may indicate a destination address of the wireless signal, for example the header information may comprise the destination address. The wireless signal may comprise a packet-based signal, for example Wi-Fi and/or Bluetooth. The header information may form at least a part of a packet header of the signal. The processor may determine that the electronic device is indicative of occupancy based on whether the source address is contained in a list of source addresses.

The processor may be configured to determine whether the detected electronic device is indicative of occupancy in dependence on a time-varying characteristic of the wireless signal. The time-varying characteristic may comprise one or more of a received signal strength of the signal, an activity level of the signal and a connectivity profile of the electronic device. The activity level of the wireless signal may, for example, comprise a data rate and/or a packet rate. The time-varying characteristic may comprise a time-variation with respect to a single electronic device (for example signal strength and/or activity). The time-varying characteristic may comprise a time-variation with respect to a plurality of electronic devices.

The processor may be configured to determine whether the detected electronic device is indicative of occupancy in dependence on the time period for which that electronic device is detected. For example, where signals transmitted from a particular electronic device are only observed within a predefined period of time, for example 1 minute, 2 minutes or some other defined time period, that device can be ignored for the purposes of determining an occupancy level. For example, where the device is observed for a time period less than a threshold time period, it may not contribute to the determination of an occupancy level. This approach can avoid changes in the occupancy level due to sporadic device detection that might not be indicative of occupancy. An example of this is where a device is carried through a corridor adjacent a region of interest, and so may be transiently detected. In some examples, once a device has been detected for longer than the threshold time period, the occupancy determination can take that device into account.

In some examples, a device may be taken into account for determining occupancy level where the signal strength of signals from that device reach or exceed a signal strength threshold. In some examples the device can be taken into account for determining occupancy level irrespective of the time period for which that device is observed, where the signal strength of signals from that device reaches or exceeds a signal strength threshold.

Where a device is observed consistently over a long period of time, for example 8, 12 or 18 hours and so on, this may be indicative of a static device, such as one that does not indicate occupancy. In this case, the observation pattern for such a device can lead to that device being ignored when determining an occupancy level.

Ignoring an electronic device for the purposes of determining occupancy level can be achieved by way of adding the electronic device to a list of devices to exclude or ignore.

In some examples, the building device can be controlled in dependence on the time-varying characteristic. For example a fan speed can be controlled in dependence on the time-varying characteristic.

A computer might be switched on in the morning, left on all day, and switched off in the evening. This does not necessarily mean that a user is using the computer all day. Thus, where a computer is determined to be present in a room, it can indicate occupancy of that room, but it is possible to more accurately indicate occupancy by considering additional factors. This will be discussed below.

In contrast to the example of a computer, a mobile telephone can be detected, which can also indicate occupancy of a room. The mobile telephone is more likely to be carried by a person, and so detection of the mobile telephone in the room can give an increased likelihood that a user is present in the room, compared to detecting the computer.

Detection of the computer and/or mobile telephone (i.e. the electronic device) can be used to more accurately indicate an occupancy level by considering the activity level of that device. For example, where a computer is powered on, and connected to a wireless network, it may transmit packets at a relatively consistent background level. When a user is actively using the computer, the rate of packet transmission will increase. Detecting this activity of the computer can enable the monitor to distinguish between a computer that is powered on but not being used by a user and one that is both powered on and in use by a user. The former need not indicate that a user is present; the latter will indicate that a user is present.

The connectivity profile may indicate times at which the electronic device is visible to the processor, for example when the receiver observes a signal emitted from the electronic device. The connectivity profile may indicate a proportion of time for which the electronic device is visible to the processor. The connectivity profile may indicate a time period for which the electronic device is visible to the processor. For example, the electronic device need not emit wireless signals continuously. Even if it did, the receiver need not continually monitor the wireless signal. In some examples, the receiver will monitor for wireless signals periodically, for example once every minute. The presence of the electronic device, as indicated by the detection of the wireless signal relating to that electronic device by the receiver, can be determined in respect of a predetermined period of time, for example 1 minute blocks, 5 minute blocks, 10 minute blocks, 30 minute blocks, hour blocks, and so on. Where that electronic device is detected at least once in that block, it can be determined that that device is present in that time period. The connectivity profile may comprise the time periods for which that device is determined to be present.

The monitor is suitably configured to store the information in bins, for example time bins or signal strength bins. As a result, the monitor is able to store information relating to signals that are observed in a particular time bin, say a 1 to 10 minute period. The monitor is also able to group signals together according to the signal strength of those signals. The monitor is therefore able to perform analysis on the binned data.

Figure 9:
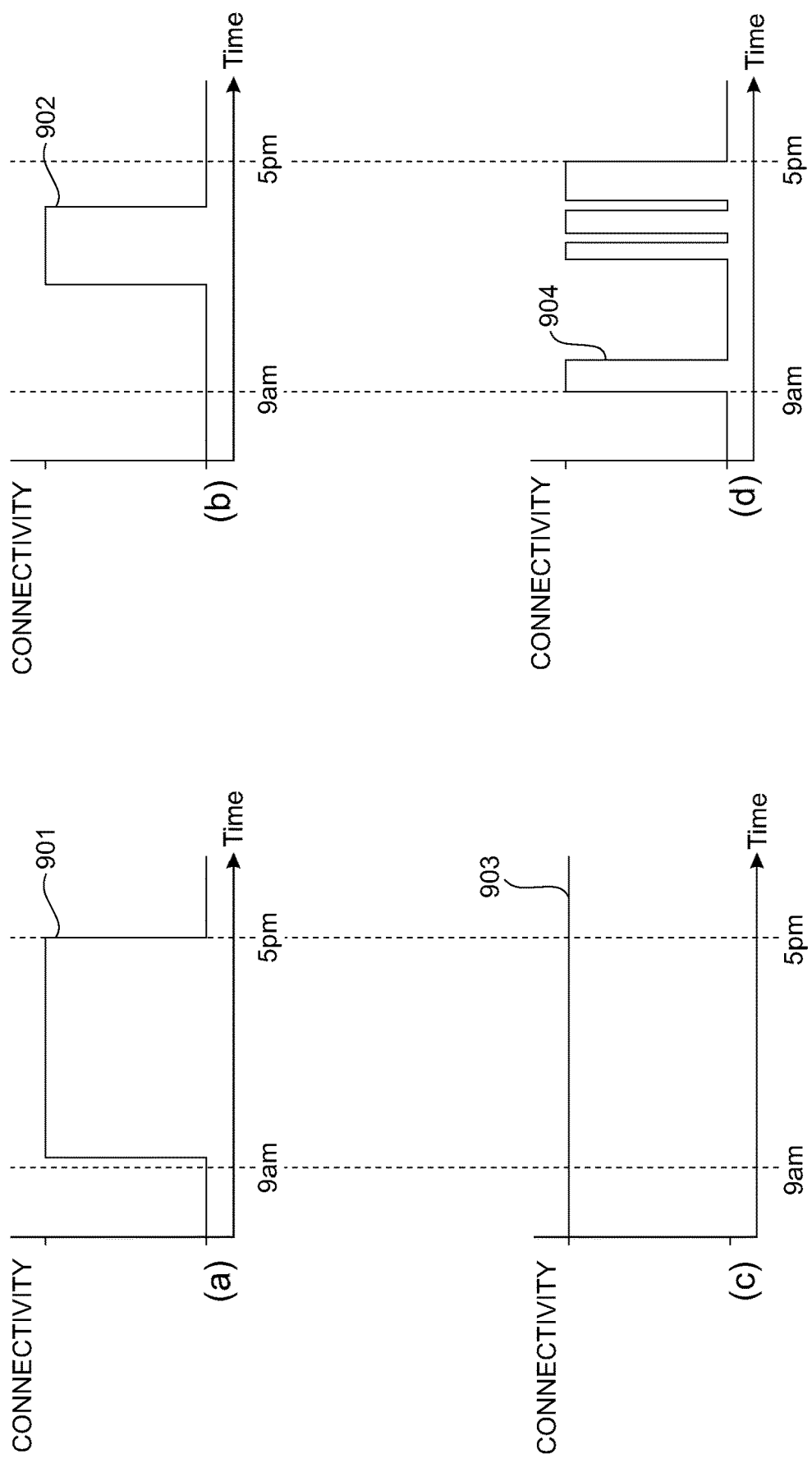
FIGS. 9a to 9d illustrate different connectivity profiles.

The connectivity profile may be a binary measure, for example '0' when the electronic device is not connected, or not present, and '1' where the electronic device is connected, or is present. For example, a laptop might exhibit a 'top hat' shaped connectivity profile, being 1 between 9 am and 5 μm, and 0 outside these hours. Examples of different connectivity profiles are illustrated in FIGS. 9a to 9d. FIGS. 9a and 9b show different 'top hat' profiles 901 902, in which an electronic device is initially not connected or visible on the network (corresponding to a '0' level). The device then becomes connected or visible on the network. A device may be switched on in the morning and left on until the evening. This is illustrated in FIG. 9a where the device has a connectivity level of '1' (i.e. it is connected) between just after 9 am and 5 pm. A different device may be used for only part of the day. This is illustrated in FIG. 9b, where the device has a connectivity of '1' for a portion of the afternoon.

Where such constant connectivity is observed for a predetermined time period (for example, 4, 8 or 12 hours), without there being a change in the signal strength from one period to the next, it can be determined that the device is not indicative of occupancy. This can be achieved by way of adding the electronic device the list of devices to exclude. Where such constant connectivity is observed for a predetermined time period (for example, 4, 8 or 12 hours), and there is a change in the signal strength from one period to the next, it can be determined that the device is indicative of occupancy. The processor can be configured to determine that there is a change in signal strength when the signal strength changes by more than a predetermined threshold change. The processor can be configured to determine that there is a change in signal strength when the signal strength changes by more than a predetermined proportion of the observed signal strength.

Where the devices have a connectivity of '0', this can indicate that the devices are not being used. Therefore, even if these devices were detected by the present system, they may not indicate that a region of a building is in use. Where the devices have a connectivity of '1', this can indicate that the devices are in use by a user, and so can give a more accurate indication that the region of the building in which those devices are located is occupied.

FIG. 9c shows an example profile 903 of a device that is continually connected. Such a device may be a printer or other device, as described elsewhere herein. Where the connectivity profile indicates that the device is present all the time, this can be used to determine that that device does not indicate occupancy. Such a device can be ignored, or otherwise taken into account, when determining occupancy of a room.

FIG. 9d shows an example profile 904 in which the connectivity of a device changes multiple times throughout the day. This can indicate that the device is mobile, for example carried into and out of a region. Additionally, a change in signal strength between (and within) each of the multiple time periods can further indicate that the device is mobile. In some examples, a profile such as that shown in FIG. 9d can indicate that a device, although not movable, is used periodically by a user at different points in the day. Such a profile can therefore indicate that the device is indicative of occupancy, for example because it is carried by a user and/or because it is being used by a user.

Figure 14A:
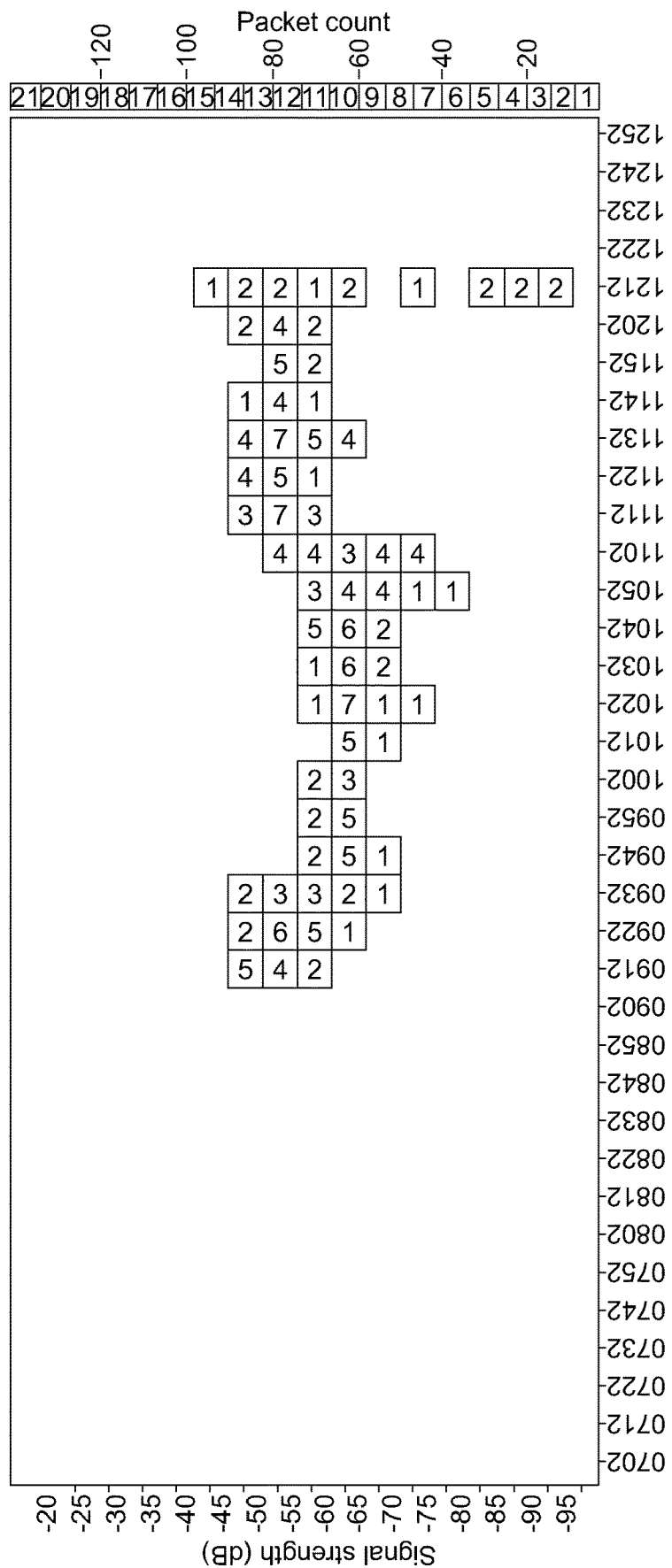
FIG. 14 illustrates an example signal profile of an electronic device.
Figure 14B:
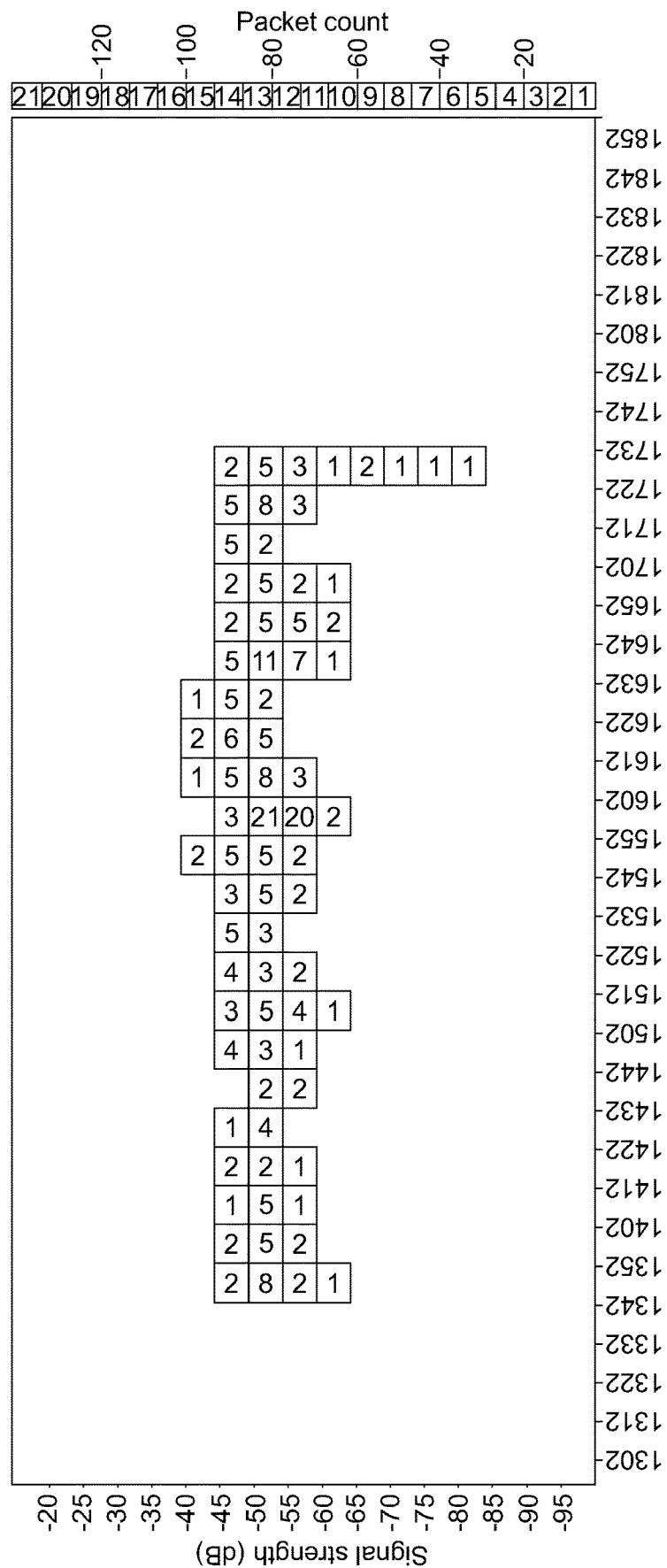

In some examples the time-varying characteristic comprises one or both of a signal strength (or average signal strength or other measure of the signal strength) and a number or rate of packets observed. The processor may be configured to determine whether the detected electronic device is indicative of occupancy in dependence on one or both of the signal strength and the number or rate of packets observed. Reference is now made to FIG. 14, showing an example signal profile of an electronic device in an office location. The illustrated profile is an example profile of a mobile telephone. The device is taken into the office just after 9 am, and moves around the region of the office in the morning. The device is taken out of the office at about 12.15 pm. The long 'tail' of the signal going to lower strength is typical for a mobile device leaving the range of an access point, e.g. as happens when the device is taken out of the area as a user carries the device. The device is taken back into the office in the afternoon and is more static in the afternoon than in the morning. A purely static device might have a profile like the illustrated afternoon profile, but for the whole day. There is a burst of activity at about 4 pm. This might indicate a heavier use of the device at that time. The device is taken out of the office at about 5.30 pm. Again, the long tail is indicative of the device leaving the region of interest.

Such signal profiles may be used to discriminate between different types of device. For example, a mobile telephone is likely to have a different profile than a laptop. Where devices of different types are determined to enter or leave a region of a building at approximately the same time, and the profiles of those devices are correlated so as to suggest that a single user is using/carrying both devices, one such device can be discounted. This can help avoid double-counting occupancy numbers. In some examples, a signal profile or a time-varying characteristic of an electronic device can be used, in conjunction with a signal profile or a time-varying characteristic of another electronic device, to determine which electronic device to count towards an occupancy level (for example by ignoring duplicate devices or ones which do not indicate additional occupancy, such as where it is determined that a user carries more than one device). In this example, the time-varying characteristics of the remaining electronic devices can be used to determine a signal to output for effecting control of a building device.

Discrimination between electronic devices permits the system to determine how many unique users are present in a given time frame, for example one day or one week. This information can help inform systems for managing buildings or spaces where knowledge relating to the number of people using a building or space can be used to manage that space more effectively, for example by allocating resources as needed. Such resources can include the number of desks, the space required, telephone or other communication services needed, and cleaning services likely to be required.

There can be provided a method of detecting occupancy of a region of a building by an animal such as a human. The method can comprise observing a wireless signal thereby to detect the presence of one or more electronic device in a region of a building. The method can comprise determining whether the detected electronic device is indicative of occupancy. The method can comprise determining an occupancy of the region of the building in dependence on that determination (e.g. determining whether the detected device is indicative of occupancy).

Determining whether the detected electronic device is indicative of occupancy may comprise reading header information forming at least a part of the wireless signal. The method may comprise determining whether the detected electronic device is indicative of occupancy in dependence on a source address of the signal. The method may comprise determining whether the detected electronic device is indicative of occupancy in dependence on a time-varying characteristic of the wireless signal.

In some examples, in a situation where the region of interest is near a busy corridor, there may be many devices being carried by people passing along the corridor. These devices may exchange signals with an access point in the region of interest. However, the detection of these devices does not mean that the region of interest is in use. In such cases, it is possible to provide a list of devices, the presence of which may indicate use of that region. As an example, a limited number of people may have access to a room adjacent a busy corridor. Source addresses of devices belonging to this limited number of people can be stored for reference by the monitor 50. Thus, when signal traffic from other source addresses is detected, the monitor 50 will ignore these signals. When signals comprising one or more of the stored source addresses are observed, the monitor 50 can determine whether the region is in use on the basis of these signals.

It is also possible to use multiple monitors. In this case, the monitors can share information, including setup/configuration information, between devices. Suitably such sharing of information is done wirelessly between the monitors. The monitors may be configured to communicate over a wired network. The monitors may be configured to communicate directly, and/or via another device. The use of more than one monitor permits a finer granularity in the positioning of devices, for example within smaller regions of the building, such as by triangulation. Thus the monitors can be configured to determine whether a device is within a room or smaller area within a building region based on the finer granularity of positioning.

An address, such as a destination address or a source address, suitably comprises at least one of a hardware address, for example a media access control address (MAC address), and a software address, for example a network address.

Suitably the building monitor, for example a processor at the building monitor, is configured to receive an environmental signal. The environmental signal can be indicative of an environmental condition in the region of the building. The monitor can be configured to output a signal such as a control signal, for controlling a state of a building system, in dependence on an indicated occupancy level and/or an indicated environmental condition.

The environmental signal may be indicative of a plurality of environmental conditions in the region of the building. There may be a plurality of environmental signals. Each of the environmental signals may be indicative of one or more environmental condition in the region of the building.

In some examples, the system can comprise a sensor such as an environment sensor. The sensor can be configured to generate the environmental signal.

The monitor may be configured to determine a change in the indicated occupancy level, and to output the signal such as the control signal, for controlling a state of a building system, in dependence on the determined change. The monitor may be configured to determine a change in the indicated environmental condition, and to output the signal such as the control signal, for controlling a state of a building system, in dependence on the determined change.

The occupancy level can comprise a number of occupants of a space or region, and/or a proportion or percentage of occupants of a maximum capacity. For example, where a room can hold 200 people, an occupancy of 25% can mean that there are 50 people present. Occupancy can be divided into occupancy bands. For example one occupancy band can comprise occupancies of between 0 and 30%, inclusive. Another occupancy band can comprise occupancies of greater than 30% and up to and including 60%. Another occupancy band can comprise occupancies greater than 60%.

The environmental condition can comprise a value such as one or more of a $CO_2$ level, a VOC level (e.g. expressed in ppm of $CO_2$ or VOC, respectively), temperature, humidity, pressure and light level. The environmental condition can comprise values separated into environmental condition bands. Taking $CO_2$ levels as an example, one band can comprise a $CO_2$ level of up to 800 ppm $CO_2$ and another band can comprise a $CO_2$ level greater than 800 ppm $CO_2$. Taking temperature as another example, one band can comprise a temperature in the range of 20 to 23 degrees Celsius, inclusive, and another band can comprise a temperature between 18 and 20 degrees Celsius or between 23 and 25 degrees Celsius. Thus, the environmental condition band need not be in respect of a continuous range of values.

Suitably, where the indicated occupancy level is in a first occupancy band, and the indicated environmental condition is in a first environmental condition band, the monitor is configured to output the signal for example for controlling a state of a building system to be in a first building system state.

In some examples, where the indicated occupancy level is in or changes to a second occupancy band, the monitor is configured to output the signal for example for controlling a state of a building system to be in a second building system state. The indicated environmental condition may be in or may remain in the first environmental condition band.

In some examples, where the indicated environmental condition is in or changes to a second environmental condition band, the monitor is configured to output the signal for example for controlling a state of a building system to be in a third building system state. The indicated occupancy level may be in or may remain in the first occupancy band.

The second building system state and the third building system state may be the same state.

To give an illustrative example, a first occupancy band comprises an occupancy of between 0% and 30%. A second occupancy band comprises an occupancy of between 30% and 80%. A first environmental condition band comprises a temperature between 20 degrees Celsius and 23 degrees Celsius. A second environmental condition band comprises a temperature between 18 degrees Celsius and 20 degrees Celsius or between 23 degrees Celsius and 25 degrees Celsius.

Thus, where the occupancy of a given room is less than 30%, and where the temperature in the room is 21 degrees Celsius, the monitor is configured to control a building system to be in a first building system state. An example of such a first building system state can comprise the state of a ventilation system. The ventilation system can comprise one or more fan, and one or more Fan Control Unit (FCU). The building system state can comprise an operating condition of the fan and/or the FCU. For example, the number and/or proportion of FCUs that are operating, the number and/or proportion of fans that are operating, and/or the speed at which one or more fan is operating. The fan speed may be expressed as 'low', 'medium' or 'high' or may be expressed as a percentage of a maximum speed of that fan.

In one example, the first building system state can be where one third of the FCUs are turned on, with the fans running at a low speed, and two thirds of the FCUs are turned off.

Where the occupancy of the room is greater, for example 60%, corresponding to the second occupancy band, and where the temperature in the room is within the first environmental condition band, say 21 degrees Celsius, the monitor is configured to control the building system to be in the second building system state. An example of such a second building system state is where two thirds of the FCUs are turned on, with the fans running at a low speed, and one third of the FCUs are turned off.

In another example, an occupancy of a room may be 20% (corresponding to the first occupancy band), and the temperature may be 22 degrees Celsius (corresponding to the first environmental condition band). The monitor may control the state of the building system to be in the first state, as above.

The temperature may increase to 24 degrees Celsius (corresponding to the second environmental condition band), without there being a change in the occupancy (or at least without there being a change in the occupancy band—this provides some tolerance in the system and can avoid the system changing quickly between two states). The monitor is configured to control the building system to be in the third building system state. An example of such a third building system state is where all the FCUs are turned on, with the fans running at a low speed.

A building device such as a FCU can be controlled in dependence both on an occupancy level of a region of a building served by that FCU (for example a region in which airflow can be controlled by that FCU) and an environmental condition associated with that region.

In some examples, where the temperature changes from corresponding to the first environmental condition band (e.g. the temperature is in a range of 20-23 degrees Celsius), to corresponding to the second environmental condition band (e.g. the temperature is in a range of 18-20 or 23-25 degrees Celsius), the monitor can additionally or alternatively be configured to control a heating or a cooling system. For example, where the temperature exceeds 23 degrees Celsius, the building device (such as the FCU or a separate system which might be coupled to the FCU) suitably cools air before causing it to flow into the region of the building. In another example, where the temperature is less than 20 degrees Celsius, the building device (such as the FCU or a separate system which might be coupled to the FCU) suitably heats air before causing it to flow into the region of the building.

In some examples, where an occupancy level is determined to be in a second occupancy band, corresponding to a relatively higher occupancy than the first occupancy band, the monitor can be configured to control a cooling system to cool air flowing into the relevant region. This can be the case even where the temperature in that region remains in the first environmental condition band, e.g. where the temperature has not yet increased. This can, in effect, anticipate a likely increase in temperature (or an increase in the rate of change of temperature) due to higher occupancy, and can cause the system to adapt to the anticipated change. This approach can help ensure the stability of the temperature in the relevant region.

The building system state (for example comprising the fan operating conditions), can be varied in different ways. One way is by effecting a step-change in the fan operating conditions. For example, changing from an initial state (e.g. fans at 30% speed) to a final state (e.g. fans at 70% speed) in one go. Another way is by effecting a more gradual change in the fan operating conditions. For example, changing from an initial state to a final state over a period of time. An example of this is changing from a 30% fan speed to a 70% fan speed at a rate of change of 5% per minute.

Figure 10:
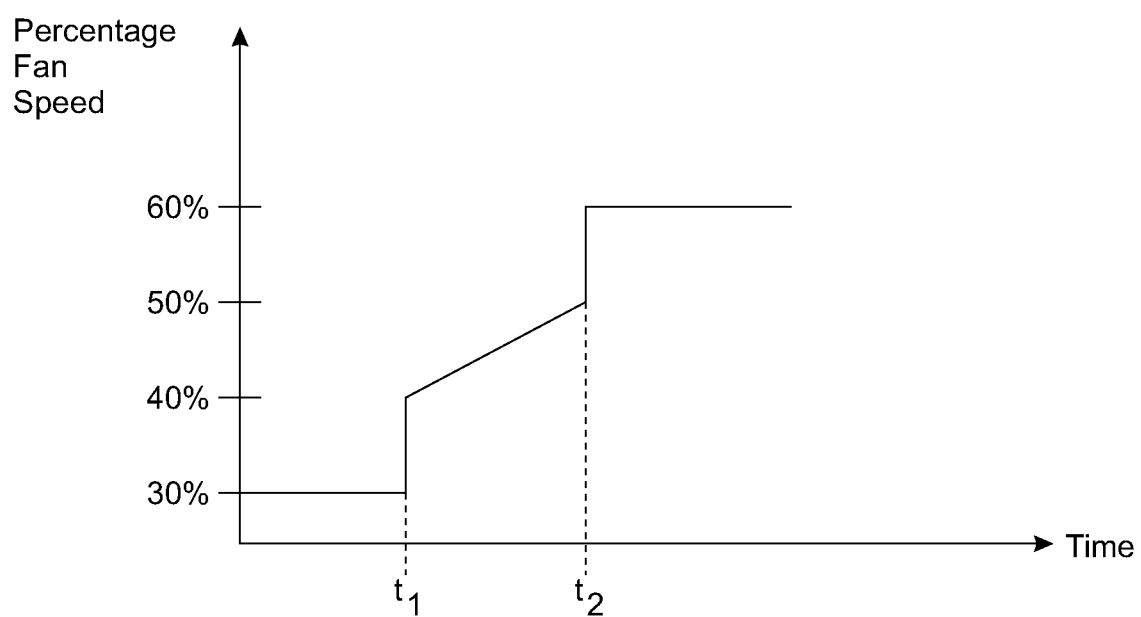
FIG. 10 illustrates an example of a change in fan speed.

The change profile can be selected as desired. Reference is now made to FIG. 10 showing an example of a change in fan speed.

Whilst the following example will discuss the speed of a fan, it is noted that the principles herein are applicable generally. For example, the speed can relate to a single fan, multiple fans, or an intensity rating of an air handling unit (AHU). For example, an AHU can comprise a fan situated on a roof of a building. The AHU fan can be configured to feed fresh air into more than one region of the building, including the whole building. In this example, there may be ductwork to two or more regions (for examples floors of the building, and/or portions of one or more floor of the building). The ductwork can comprise louvers which can be opened and closed to regulate air flow into one or more region. The louvers may be adjustable between fully open, fully closed, and one or more partially open position. This can allow greater control over the air flow. In such examples, when louvers are closed (for example in response to occupancy-based control) the AHU fan speed will decrease, for example because pressure sensors provided in ducts of the ductwork directly or indirectly inform the AHU to decrease the fan speed, leading to energy savings. In such examples, the fan speed need not be controlled directly, but it can be influenced by controlling the louvers which affect the pressure in the ducts.

In an example. a fan is initially operating at 30% of its rated maximum speed. The fan supplies fresh/outdoor air into a particular room in a building. The room is initially occupied at 10% of its capacity, so the low fan speed is appropriate. At time $t_1$ more people enter the room, increasing the occupancy beyond a threshold amount, say to 15%. In response, the fan speed can be increased. The new speed set-point is, in this example, 60%. The fans need not go straight to 60% since the number of people in the room is still relatively low. The fan speed might increase to 40% in a single step, then increase gradually towards 60%. A gradual increase in fan speed can be sufficient to maintain air quality. A faster increase in fan speed (which would lead to higher fan speeds more quickly) would be a waste of energy in this example. At time $t_2$ more people enter the room, taking the occupancy level to 50%. This causes the monitor to control the fans to operate at 60% speed straight away, for example by outputting a signal to effect the increase in fan speed. The increase in number of people has meant that the $CO_2$ levels, for example, will increase more rapidly, and a higher fan speed is therefore appropriate to ensure that air quality does not deteriorate as a result.

One or more of the fan speed, the proportion of fans operating and the air temperature of the air provided by the fans can be controlled in dependence on one or more of the following environmental conditions relating to the region of the building: temperature, humidity, level of carbon dioxide ($CO_2$), level of volatile organic compounds (VOCs).

In some examples, where the levels of $CO_2$ exceed a pre-determined threshold, the fan speed and/or the proportion of fans operating can be increased. This approach permits control of the ventilation system to be carried out in dependence on the occupancy of the region, as well as the air quality of that region.

The pre-determined threshold $CO_2$ level may be selected in dependence on the occupancy level. For example, a lower threshold level may be selected where the occupancy is greater. Typically, the $CO_2$ levels in a room will increase over time, but lag behind the occupancy level of that room (as shown in FIG. 7). Additionally the measured $CO_2$ levels may lag behind the actual $CO_2$ levels in the room. For example, a lecture theatre may fill up quickly at the start of a lecture, increasing the occupancy level (say from 0% to 80%). The $CO_2$ levels in the room will change slowly, and may increase beyond a desirable level (which might be a 'standard' threshold level, e.g. one that does not take account of the occupancy level of the room, such as 1200 ppm $CO_2$) within a time period that may be 30 minutes to 2 hours long. Turning on the fans (or boosting the fans) only when this level is exceeded is likely to mean that the $CO_2$ levels will overshoot this 'standard' threshold level (since the action of the fans will take time to reduce the $CO_2$ levels). Such an overshoot would mean that $CO_2$ levels in the room were higher than desirable for a period of time, which can reduce concentration and decrease productivity.

It is possible to choose a lower 'standard' threshold level, but this can mean that the fans turn on (or increase in power) unnecessarily, which wastes energy.

In an example of the present techniques, a $CO_2$ threshold level can be selected in dependence on the occupancy of the region, for example in dependence on the occupancy band. In some examples, a threshold of 800 ppm of $CO_2$ can be selected where the occupancy is in the first occupancy band (up to 30% in this example). Thus, where the $CO_2$ levels in a room exceed 800 ppm, the monitor can be configured to change the state of the building system in response. For example by increasing the number of FCUs operating, and/or by increasing the fan speed. Reference is made to the example above, where one third of the FCUs are operating, and are operating at a low speed. The environmental condition can comprise the $CO_2$ levels in the room. The first environmental condition band can comprise $CO_2$ levels of up to 800 ppm, and the second environmental condition band can comprise $CO_2$ levels that exceed 800 ppm. When the threshold level (here, 800 ppm) is exceeded (e.g. where the indicated environmental condition changes from being in the first environmental condition band to being in the second environmental condition band) the monitor suitably controls the fans such that two thirds of the FCUs are operating, at a low speed. In some examples, the monitor may control the fans such that the fans already operating increase in speed, for example to a medium speed. Combinations of increases in the number or proportion of fans operating and operating speeds of the fans are possible.

A threshold of 600 ppm of $CO_2$ can be selected where the occupancy is in the second occupancy band (between 30% and 80% in this example). Thus, where the occupancy of a room is higher, and $CO_2$ levels in that room exceed a lower threshold of 600 ppm, the monitor can be configured to change the state of the building system in response. For example by increasing the number of FCUs operating, and/or by increasing the fan speed.

Where occupancy levels are higher, a quicker increase in $CO_2$ levels can be expected. Controlling ventilation to the room based on a lower $CO_2$ threshold can mean that, despite this quicker increase, the levels are still kept below the desired maximum level.

As well as, or instead of, lowering the threshold where occupancy is higher, the number of fans operating and/or the fan speed of fans operating can be increased, relative to where the occupancy is lower.

This approach can help keep $CO_2$ levels below a desired maximum (for example 1200 ppm) by adjusting the ventilation to take account of occupancy. This can mean that $CO_2$ levels are maintained at low levels, below the desired maximum. This approach means that the air quality in the room can be maintained in a more stable manner, helping to reduce or avoid 'overshoots' where air quality dips below some desired limit before being brought back above that limit. Ventilation can be adjusted in dependence on occupancy level, for example to ensure that the flow rate of air into the room is sufficient for the determined occupancy level. This can be based on the building regulation guidelines for cubic feet per minute of air per person. Ventilation can be adjusted by determining a percentage increase or decrease in occupancy and effecting control of the fan speed to increase or decrease by the same, or a similar, percentage.

Similarly, where the humidity of air within the region exceeds a threshold (which might be between a first environmental condition band with relatively lower humidity and a second environmental condition band with relatively higher humidity), the monitor can be configured to control the building system in response thereto. For example, the number or proportion of fans operating and/or the fan speed of fans operating can be increased. In some examples, a dehumidifier can be controlled in dependence on determining that the detected humidity levels exceed a threshold. The dehumidifier can be in fluid communication with one or more fan controlled by the FCUs.

The environmental signal may be indicative of air quality, for example air quality in the region of the building, such as an indoor air quality.

The environmental signal may comprise an indication of whether the region is in fluid communication with an external environment. For example, the environmental signal can comprise an indication that a window is open. The window can provide for fluid communication between the region (for example a room) and an external environment (for example the outside environment). Suitably the indication of whether the region is in fluid communication with the external environment indicates fluid flow paths other than airflow through the fan or ventilation system controllable by the monitor. This may include airflow through a secondary fan or ventilation system that is not controllable by the monitor.

The environmental signal can comprise an indication of wind speed and/or wind direction. This can allow the monitor to control the ventilation, for example by controlling fan speed, in dependence on an expected rate of flow of air from an outside environment. Thus, where a window is open, and a wind speed of wind outside the window is above a given wind speed threshold, the fans can be turned down or off to save energy. Turning the fans down only when the wind speed exceeds the threshold can help to ensure that the air flow rate into or out of the region (or room) meets a minimum desired flow rate. Thus, the present techniques can permit an enhancement of air quality in the region whilst reducing energy usage.

Approaches, as in the techniques described herein, whereby operating hours and/or operating intensities of building devices can be reduced may help to increase the longevity of the building devices, for example infrastructure such as FCUs and fans.

In some examples the building monitor can be configured to receive an input indicative of a sound level in the region of the building. For example, the building monitor can be coupled to a microphone, or other sound detection device. The environment sensor may be configured to sense sound level. The environment sensor may comprise a microphone. The building monitor is suitably configured to determine an estimated occupancy level in dependence on the indicated occupancy level and the input indicative of a sound level. Thus, in some examples, correlation between noise levels and occupancy can be used to increase the accuracy of an estimated occupancy. For example, where detected sound is at approximately 50 dB, it is likely that the occupancy of a room will be greater than where detected sound is at approximately 30 dB. The noise detection can suitably discriminate between machine noise (which need not indicate occupancy) and human noise, such as talking, which is more likely to indicate occupancy. In one example, the noise detection can use frequency analysis of the noise to categorise the noise, or portions of the noise, as one or other of occupancy-indicating noise (such as talking) or non-occupancy-indicating noise (such as background machine noise which may always be present, or be present for pre-set periods of time). In some examples, the sound level detected can be indicative of an activity in the region of the building. For example, where human noise is detected at a higher level, this might be indicative of people breathing more (for example when exercising), thereby leading to a quicker change in the environment in that region, such as a quicker increase in $CO_2$ levels.

In some examples of the present techniques, the monitor can be configured to output the signal in dependence on a measure of correlation between the occupancy level and the environmental condition. This can enable an improved accuracy in the occupancy level by comparing device and occupancy profiles in situations which result in bigger changes in environmental conditions. E.g. where a change in the environmental condition is lower than would otherwise be expected for the number of devices detected, this can be attributed to double-counting occupancy (for example where users have both mobile telephones and laptops). Subsequently, where similar device and occupancy profiles are seen, the occupancy level can be modified accordingly. This can enable the monitor to better learn the device and occupancy profiles that indicate higher or lower occupancy levels and/or changes in the environmental condition. Furthermore by using a correlation between occupancy level or changes in occupancy level, and environmental condition or changes in environmental condition, the monitor can be enabled to predict with a greater accuracy future likely changes. For example, the monitor can be enabled to predict the occupancy level based on the environmental condition, or to predict the environmental condition based on the occupancy level. Such predictions can enable the monitor to output a signal for effecting control of a state of a building system which can pre-empt changes in the region of the building. This can enable a more accurate and/or quicker response to be made to such changes. In some examples, a signal such as a control signal can be output before the change occurs, which can enable the building system to more effectively control the environment in the region of the building.

An example of this is where it is determined, for example based on correlation data, that an increase in occupancy level above a threshold is indicative that indoor air quality will begin to decrease in a room and that the ventilation level should be increased to a predetermined level. Such a determination permits the monitor to output a signal in dependence on the occupancy level without needing to wait until a measure of the air quality falls below a threshold. Thus, the decline in air quality can be pre-empted and avoided.

In another example, a determination of an estimated heat load can be made in dependence on the detected occupancy level or device profile. The determination can include that the heat load will increase, for example due to increased occupancy. This determination can be based on correlations of previous data relating to the occupancy level and the environmental condition. The monitor can be configured to output a signal in dependence on that determination, which signal enables a building control system to modify the heating of that region of the building (for example by reducing the temperature of air flowing into that region).

In some examples an output from an occupancy sensor can be calibrated in dependence on an output from an environment sensor in the same region of the building as the occupancy sensor. In some examples the environment sensor need not be associated with the same region of the building as the occupancy sensor. For example, correlated occupancy levels and environmental conditions can be used to calibrate another occupancy sensor, or the same occupancy sensor in an alternative location. The correlated occupancy levels and environmental conditions can be used to train an algorithm such as a machine learning algorithm. This approach of calibrating an occupancy sensor can in some examples be used even where an environment sensor is not present together with the occupancy sensor.

In a related example, historic occupancy data (correlated with environment data) can be used to predict when occupancy will occur and/or at what occupancy level. E.g. knowledge that a certain occupancy level at, e.g., 7 am is indicative of a certain other occupancy level at, e.g., 9 am can be used to predict when building systems might optimally be started or controlled. The monitor is suitably configured to output a signal in accordance with such a prediction.

Figure 11:
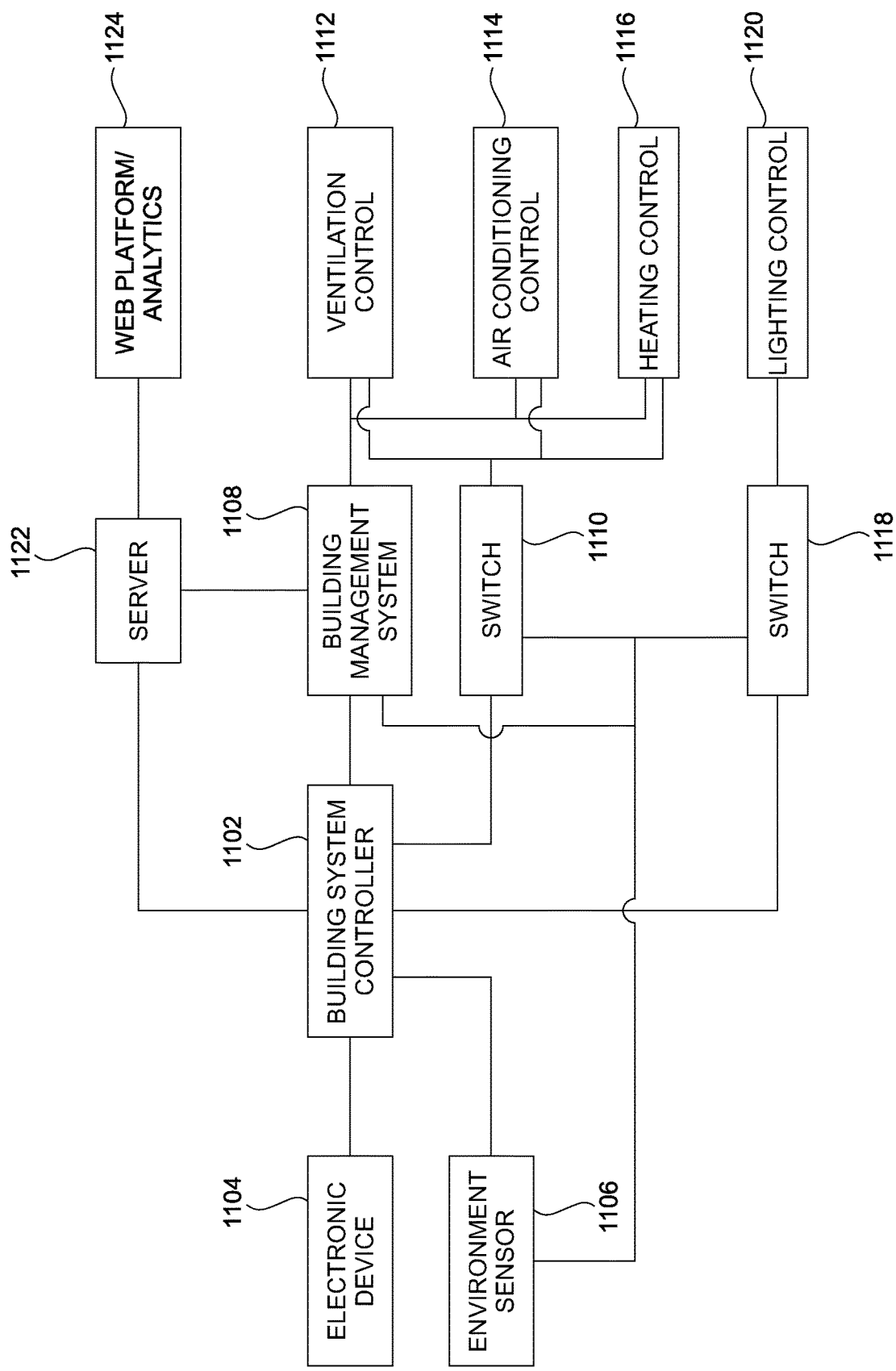
FIG. 11 illustrates an example system comprising a building monitor.

An example of a system comprising a building monitor will now be described with reference to FIG. 11. A building monitor 1102 is configured to detect wireless signals from one or more electronic device 1104. The wireless signals can comprise Wi-Fi and/or Bluetooth packets. The building monitor is coupled to an environment sensor 1106. The environment sensor is configured to sense one or more of temperature, humidity, $CO_2$ level, VOC level and so on. The building monitor can couple to the environment sensor by a wired or wireless connection, for example Bluetooth, Zwave and so on.

The building monitor 1102 can determine a number of electronic devices and can infer an occupancy level from the number of electronic devices. The building monitor can be configured to output one or more of the number of electronic devices detected and the inferred occupancy level. The building monitor can be configured to output a control signal to cause a change in state of a building device. Such an output from the building monitor can be passed to a building management system 1108 over, for example, BACnet over IP, Modbus, Wi-Fi, Bluetooth and so on. The output from the building monitor 1102 is also, in this example, passed to a switch 1110. The switch 1110 can comprise an infrared switch.

The building management system 1108 couples to a ventilation control 1112, an air conditioning control 1114 and a heating control 1116. Not all these controls need be provided in all examples. The building management system can couple to these controls over BACnet, Modbus etc, to effect control of the HVAC infrastructure.

The switch 1110 can also couple to the ventilation control 1112, the air conditioning control 1114 and the heating control 1116, for example using infrared signalling.

The building monitor 1102 is coupled to another switch 1118, for example over a wired or wireless connection such as Wi-Fi, Bluetooth, Zwave and so on. This switch 1118 couples to a lighting control 1120.

The building monitor 1102 couples to a server 1122, for example over a cellular connection such as a 3G and/or a 4G network. The server is suitably coupled to the building management system 1108, for example over a network such as the internet. The building monitor 1102 may, in some examples, comprise the server 1122. The server can send a control signal to the building management system 1108 to effect control over one or more of the ventilation, cooling, heating and lighting of a building. The server also couples to a web platform/analytics module 1124, configured to perform analysis of data captured and/or generated by the building monitor. Such analysis can provide information regarding trends in the data, correlation between different data sets and so on. This can be used, for example by the building monitor, to improve the control techniques.

Figure 12:
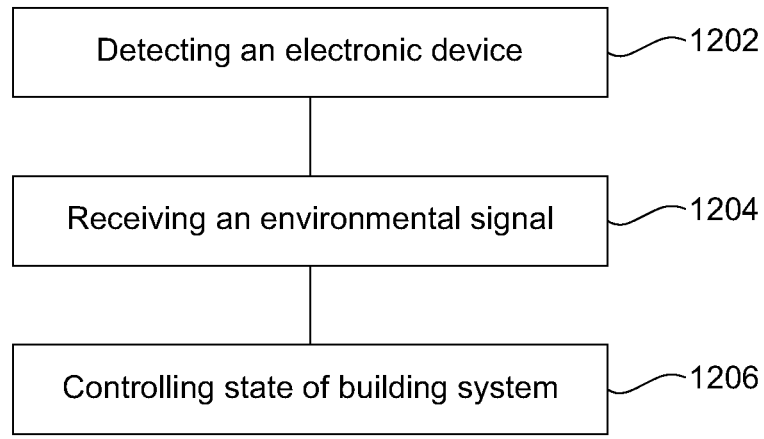
FIG. 12 illustrates a method of controlling an environment.

A method of controlling an environment in a region of a building comprises detecting the presence of one or more electronic device thereby to indicate an occupancy level of a region of a building (FIG. 12, 1202). The method comprises receiving an environmental signal indicative of an environmental condition in the region of the building (1204), and controlling a state of a building system in dependence on the indicated occupancy level and the indicated environmental condition (1206).

The method may comprise determining a change in the indicated occupancy level, and controlling a state of a building system in dependence on the determined change. The method may comprise determining a change in the indicated environmental condition, and controlling a state of a building system in dependence on the determined change.

In some examples, a building monitor for controlling an environment in a region of a building is configured to couple to a building system and operable to change a state of the building system. The monitor comprises a processor, and a receiver coupled to the processor. The receiver is configured to wirelessly detect the presence of one or more electronic device thereby to indicate an occupancy level of a region of a building. The processor is configured to determine a time-varying characteristic of the detected one or more electronic device. In some examples, the determination of the time-varying characteristic can be performed remote from the monitor, for example at a remove server. In some examples, the determination can be performed partially at the monitor and partially at the remote server. The monitor is configured to control a state of a building system in dependence on the indicated occupancy level, and to change a state of a building system in dependence on the determined time-varying characteristic.

Figure 13:
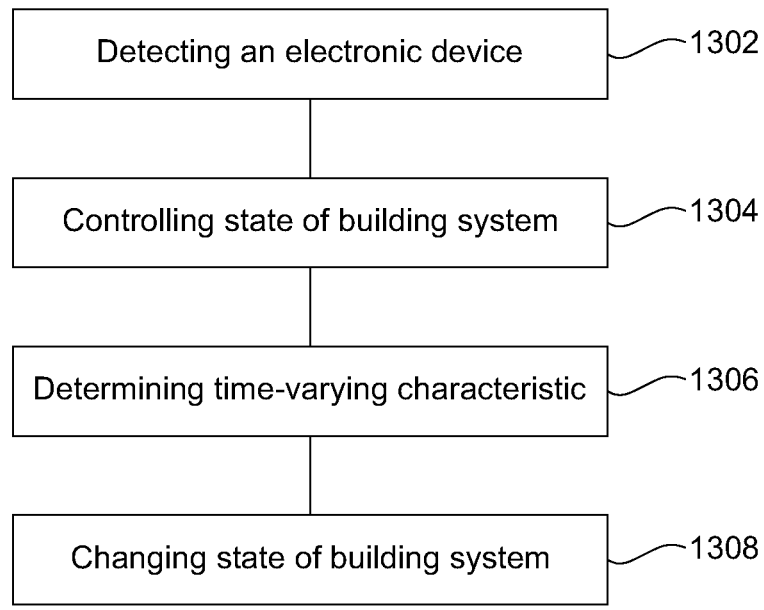
FIG. 13 illustrates another method of controlling an environment.

In some examples, a method of controlling an environment in a region of a building comprises detecting the presence of one or more electronic device thereby to indicate an occupancy level of a region of a building (FIG. 13, 1302), controlling a state of a building system in dependence on the indicated occupancy level (1304), determining a time-varying characteristic of the detected one or more electronic device (1306), and changing a state of a building system in dependence on the determined time-varying characteristic (1308).

As well as determining that the building is in use (for example when people arrive in a building) the monitor 50 is additionally or alternatively able to determine when a building is not in use (for example when people leave a building).

The control criterion permitting the monitor 50 to determine whether a building is not in use, or is no longer in use, may be the same as the control criterion permitting the monitor 50 to determine whether the building is in use. For example, the control criterion may be a threshold value of a variable that indicates that a building is in use when the value of that variable is, for example, above that threshold value, and that indicates that the building is not in use when the value of that variable is, for example, equal to or below that threshold value.

The threshold value is suitably configurable, such as user configurable (which might be via a local interface or over a network). In other examples, there may be a separation of values between a value indicating use and a value indicating that the building is not in use. For instance, the monitor may be configured to determine that the building is in use where the value of a variable exceeds a threshold value, and to determine that the building is not in use where the value of the variable drops a predetermined amount below the threshold value. This 'hysteresis' in the behaviour of the monitor can restrict or avoid quickly alternating between states when the value of the variable is close to the threshold value. The predetermined amount can be configurable, such as user configurable (again, this might be via a local interface or over a network). The predetermined amount can be selected as desired to reduce or avoid the quick alternation between states. Where the monitor is to control lighting, for example, this can restrict or avoid undesirable flickering of the lights.

Suitably the monitor 50 is configured to determine whether the control criterion is satisfied within a predetermined period of time. The predetermined period of time is suitably less than about 30 minutes. Preferably the predetermined period of time is less than about 20 minutes. More preferably the predetermined period of time is less than about 10 minutes, for example less than about 5 minutes. The monitor 50 may be configured to observe wireless signals for a given time frame in every predetermined period, for example for 5 minutes every 30 minutes, or for 30 seconds every 10 minutes. This sampling of the wireless signal means that the monitor 50 need not be turned on all the time. This can save energy. The sampling also helps to reduce quick alternation between states. It may also have the effect of smoothing out transient effects, or allowing such transient effects to settle, reducing the effect of such transient effects on the monitor and therefore on the state of the building system.

A relatively shorter predetermined time period can reduce the delay in response time of the monitor.

In one example of operation, the monitor 50 is configured to determine that the building is in use on observing one packet of a signal (or observing a number of packets of a signal above any desired threshold number of packets, and/or observing a rate of packets of a signal above any desired threshold rate). Control of the building system can be effected in response to this determination. For example, heating can be turned on and/or ventilation can be increased. The monitor 50 may be configured to determine that the building is not in use if it does not observe any packets of a signal (or observing a number of packets of a signal less than any desired threshold number of packets, and/or observing a rate of packets of a signal less than any desired threshold rate) for a certain amount of time, such as the predetermined period of time. Control of the building system can be effected in response to this determination. For example, heating can be turned off and ventilation can be reduced.

Suitably the monitor is configured to determine that the building is in use on observing a number of packets of a signal above a background level of packets (or a background activity of the wireless network or channel).

Suitably the monitor is configured to determine that the building is not in use on observing a number of packets of a signal at or below a background level of packets (or a background activity of the wireless network or channel). The background level may be predetermined, and/or user-adjustable. The background level may be zero. The background level may be automatically adjustable by the monitor in dependence on an average level, for example a level averaged over a time when it is known or likely that the building is not occupied, such as at night-time for a typical office environment.

Conveniently the monitor is configured to continually observe the wireless signal, or to observe the wireless signal at intervals, such as at predetermined intervals. For controlling systems such as lighting it is preferable for the monitor to continually observe the wireless signal to ensure that the lights can be turned on without delay (or with a minimum of delay). Thus the monitor may be configured to observe a wireless signal continually or at a predetermined interval in dependence on the powered system (or building device) which is being controlled. The predetermined interval is suitably configurable, for example user configurable.

In many situations where the building device is in a powered-on state it is not necessary for the monitor 50 to be configured to continually observe the wireless signal. For example, where a light is turned on, it may not be desirable to turn the light off immediately when the last person leaves the region of the building. Instead, it may be preferable to turn the light off a certain period of time after the last person has left the region of the building. To achieve this, the monitor may be configured to continually observe the wireless signal, and the control criterion may be satisfied if no determination that an electronic device of interest is present has been made for a predetermined period of time. Alternatively, the monitor may be configured to observe the wireless signal periodically. The control criterion may be satisfied if no determination that an electronic device of interest is present has been made for a predetermined number of successive periods. In other words, the way in which the monitor is configured to observe the wireless signal may differ depending on whether the building device is in a powered-off state (in which case it may be desirable to be able to turn it on quickly) or in a powered-on state (in which case it may be desirable to provide a delay, such as a timeout period, before turning it off).

Thus the behaviour of the monitor 50 in observing the wireless signal may depend on the state of the building device and/or on the state of the building system.

The monitor 50 may observe a wireless signal periodically where more than one channel or frequency is to be observed by the monitor. In this example, the monitor will switch between different channels or frequencies so as to be able to observe on each of them. Thus, the monitor will not observe on any given channel all the time, but will observe on that channel periodically as the monitor switches between channels. In one example, the monitor is configured to observe on a given channel for a predetermined period of time, such as 0.5 or 0.2 seconds, before switching to the next channel. The monitor is suitably configured to switch to observing the next channel on determining that a signal has been observed on the currently observed channel Suitably, the monitor is configured to switch to the next channel at the earlier of the expiry of the predetermined period of time, and when a signal has been observed on the current channel.

A plurality of transceivers can be provided. In this case, each transceiver can be configured to observe on one or more channel. Thus this permits more regular observation of the channels. This can reduce potential misses of occasional signals, and therefore improve the responsivity of the system.

In other examples, further to this mode of operation, additional information associated with the signal can be used to provide finer control. On observing a signal, or a packet of a signal, the monitor 50 is suitably configured to determine information associated with that signal, or packet, and to store that information. The information is suitably stored in the monitor memory 58. For example, the time of observation of the signal, the address (destination and/or source) of the signal and the received signal strength of the signal can be determined and stored. The behaviour or variation in any one or more of the detected variables over time can be used to provide filtering of which signals will satisfy a control criterion.

In some examples, where an electronic device such as a mobile telephone is connected to a Wi-Fi network, and carried about by a person moving through the region of the building, the source and/or destination information of signals observed from that electronic device may not change in the course of a day. However, as the electronic device is moved through the region of the building, and thus moved relative to the monitor 50, the received signal strength will vary over time. Thus the monitor 50 may be arranged to determine that the region is occupied on the basis of this time-varying of this observed variable.

The time-varying of the signal strength, or the signal strength profile, from a particular device can be used to determine which devices are likely to be mobile and therefore associated with a person. Thus, if a signal strength profile varies throughout a given time period, such as 8 hours, 12 hours, 24 hours, 48 hours and so on, it can be determined that the device is a mobile device and is to be associated with a person. This determination can be made even if the device is continuously present in the region of the building throughout the relevant period.

In another example, a combination of the time-variance (or otherwise) of different variables can be used to determine presence in and/or use of a region of a building. An electronic device is present in the region, and does not move. The monitor 50 is configured to observe signals continuously or periodically, for example once every ten minutes (for example in a power saving mode) or once every 0.5 seconds (for example in a continuous observation mode, which might include channel or frequency switching/hopping). The monitor observes signals from the electronic device, and determines that the signals from the electronic device are regularly detected over a given time period, for example a time period in the range of approximately twelve to forty-eight hours. The observed signal strength of the signals does not appreciably vary during the given time period. The monitor 50 may be configured to recognise the electronic device as one that does not provide an indication of occupancy or use of the building (as would be the case if this device was, say, a printer). Signals from this device could therefore be ignored or filtered out by the monitor 50.

The monitor 50 is therefore able to modify its operation based on previously observed signals. Here, if the address of the electronic device is not on a list of known devices for the monitor 50 to ignore, it might initially determine use of the building in dependence on signals from this device. After the given time period, or some other defined time period, the monitor may determine that this device does not indicate occupancy or use, and may write the address of the device to the monitor memory 58, and ignore signals from that device in future.

In this way, the monitor 50 is able to modify its behaviour in dependence on observed signals.

On determining that a control criterion has been satisfied (whether it be to indicate a change from more occupied (e.g. a higher occupancy level) to less occupied (e.g. a lower occupancy level), e.g. where the occupancy level decreases, or from less occupied to more occupied), e.g. where the occupancy level increases, the monitor 50 is suitably configured to change a state of the building system. The state of the building system can be changed in dependence on the determination that the control criterion is satisfied. The monitor 50 is suitably configured to effect a change in a state of at least one building device.

The monitor can effect the change in a state of the building device, or of the building system, by controlling that device or the building system to enter a different state from the state which it is in at that time. In other words, to alter the state of that device. This includes turning powered systems, such as lighting and heating, off or on, or otherwise altering the power usage of devices, and so of the building system. The monitor 50 is suitably configured to do this by directly controlling power to a system. For example, the monitor may be embedded within a powered system, such as a lighting control circuit. On determining that the region of the building of interest has changed from being more occupied to being less occupied, the monitor can switch off or reduce power to at least a part of the building device, e.g. lighting circuit. On determining that the region of the building of interest has changed from being less occupied to being more occupied, the monitor can switch on or increase power to at least a part of the building device, e.g. lighting circuit.

The monitor 50 is additionally or alternatively spaced from the powered system, and operable to connect wirelessly and/or via a wired connection to the powered system or to a building system interface. This connection suitably permits the monitor 50 to control the powered system, i.e. the building device. For example, the transceiver 55 of the monitor 50 is operable to wirelessly transmit a signal such as a control signal to effect control of the powered system. Additionally or alternatively the monitor 50 may comprise a transmitter operable to transmit the control signal. The processor is suitably configured to generate the signal. The monitor 50 is suitably configured to send a signal over a wired connection such as the signal line 54 to effect control of a powered system.

Figure 3:
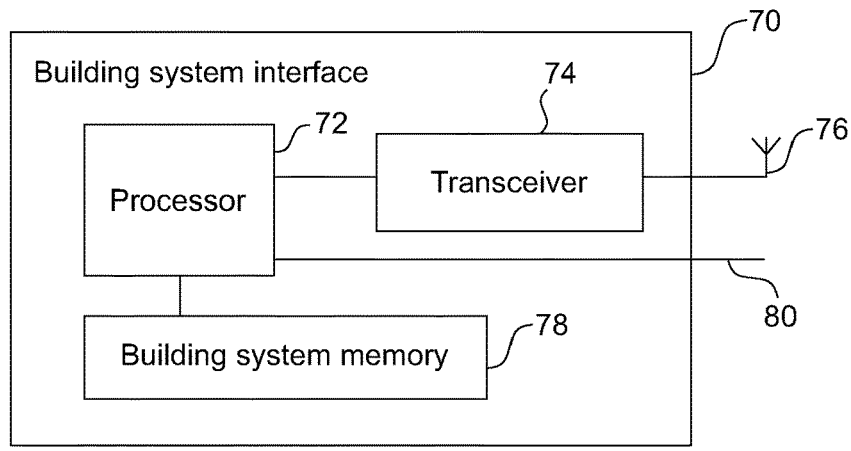
FIG. 3 schematically illustrates a building system interface.

An example of a building system interface is shown schematically in FIG. 3. The building system interface 70 comprises a processor 72, a transceiver 74 coupled to the processor 72 and to an aerial 76. The building system interface comprises a building system interface memory 78 coupled to the processor. The building system interface comprises a signal line 80 for receiving input signals and outputting output signals. In other examples, a plurality of signal lines can be provided. In these examples the input signals and output signals may be transmitted on different ones of the plurality of signal lines. In some examples, a transmitter and a receiver are provided in addition to or as an alternative to the transceiver 74.

In the example illustrated in FIG. 3, the building system interface 70 is operable to interface between the monitor 50 and a building device. The building system interface 70 is configured to receive the signal, such as a control signal, transmitted by the monitor 50. The control signal can be received via the aerial 76 and the transceiver 74. The control signal can be received by the signal line 80. The building system interface is configured to determine an output signal in dependence on the received control signal. The output signal may comprise the received control signal. In some examples the output signal may be the received control signal. In some examples the building system interface 70 acts like a relay connecting the monitor 50 to the building device. Suitably the building system interface 70 is configured to determine the output signal with reference to the building system interface memory 78. The building system interface memory 78 may comprise a look-up table. The look-up table suitably links the received control signal to the desired output signal to effect control of one or more building device in accordance with the control signal. Using a look-up table in this way can reduce the size and/or complexity of the control signal. This permits the control signal to propagate more quickly and/or permits a reduction in the bandwidth requirements for transmission of the control signal.

The output signal determined by the building system interface 70 may comprise more than one output signal portion. Where the signal such as the control signal received from the monitor 50 specifies that a plurality of building devices are to be controlled, the building system interface 70 suitably determines that the output signal comprises a plurality of output signal portions. The number of output signal portions may correspond to the number of building devices to be controlled. The building devices to be controlled may be grouped into one or more group. Suitably the number of output control portions corresponds to the number of groups of building devices. In some examples the monitor is configured to output all of the output signal portions. In some examples, a plurality of monitors is configured to output the output signal portions. For example, one monitor may be configured to output a first group of output signal portions and another monitor may be configured to output a second group of output signal portions. Thus one or more monitor can effect control over one or more building device. This approach permits multiple monitors to facilitate control over an AHU, for example based on aggregate occupancy of a plurality of regions of a building.

In an example, one group comprises lights that can illuminate a corridor, and another group comprises lights that light a particular room and a desk fan within that particular room. In this example, where an electronic device is present in the corridor, the monitor is operable to send a control signal to turn the corridor lights on. Where an electronic device is present in the room, the monitor is operable to send a control signal to turn on the room light and the desk fan. Another group may comprise computing equipment, such as a computer. In this example, where an electronic device is present in the room, the monitor is operable to send a control signal to turn on the computing equipment. This control signal may be sent over a computing network to which the computing equipment is connected, such as a Local Area Network (LAN). Such network control can be used to put the computing equipment into sleep mode (where the room is determined to be not in use), or wake the computing equipment from sleep mode (where the room is determined to be in use).

In another example, on one floor of a building there may be a plurality of monitors configured to feed occupancy level in aggregate to effect control of fans (e.g. in the FCUs) based on the occupancy level. The monitors can be configured to turn the fans down as the occupancy level goes below a pre-determined threshold. On another floor of the building there may be a monitor to effect control of a fan and a cooling coil in the FCUs (to provide ventilation and cooling) based on occupancy level, e.g. as the occupancy level goes above a certain threshold, the cooling starts with a certain ventilation flow rate.

Figure 4:
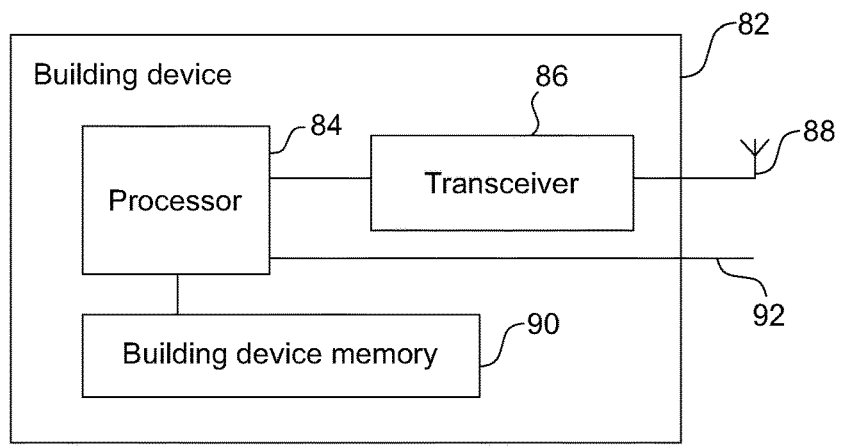
FIG. 4 schematically illustrates a building device.

A building device is schematically illustrated in FIG. 4. The building device 82 comprises a processor 84, a transceiver 86 coupled to the processor 84 and to an aerial 88. The building device 82 comprises a building device memory 90 coupled to the processor 84. The building device comprises a signal line 92 for receiving input signals. In some examples, a receiver is provided in addition to or as an alternative to the transceiver 86.

The building device 82 is operable to communicate with the building system interface 70. The building device 82 is configured to receive the output signal transmitted, or output, from the building system interface 70. In some examples, the building device 82 is operable to communicate with the monitor 50 additionally or alternatively to being configured to communicate with the building system interface 70. In these examples, the building device 82 is configured to receive the signal such as the control signal output from the monitor 50. The building device 82 is configured to receive the output signal transmitted from the building system interface 70 and/or the control signal output from the monitor 50 via the aerial 88 and the transceiver 86. Additionally or alternatively, the building device 82 is configured to receive the output signal transmitted from the building system interface 70 and/or the control signal output from the monitor 50 via the signal line 92. The building device 82 is configured to change its state in response to the received signal.

For example, if the monitor 50 transmits a signal such as a control signal to turn the building device off, the building device will turn itself off in response to receiving the control signal from the monitor 50 and/or in response to receiving an output signal transmitted from the building system interface 70 in response to receiving the control signal. Turning off the building device may leave at least a portion of control circuitry of that building device on, or powered, so as to permit receiving of a further signal to turn the building device back on. For example, where the building device is a light, the light can be turned off, and control circuitry can remain powered awaiting a further signal to turn the light back on. In an example, a leakage current can be passed through the building device when the building device is in an OFF state. The leakage current powers the control circuitry, but is not sufficient to power the building device itself.

Figure 5:
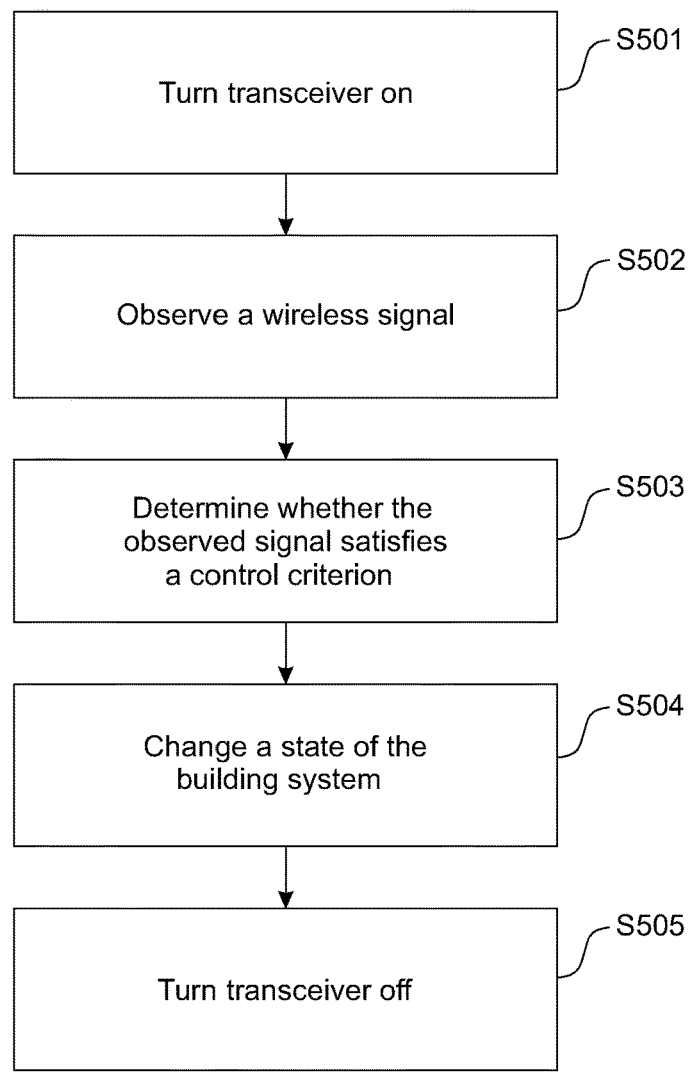
FIG. 5 illustrates a process of using the monitor.

FIG. 5 illustrates an overview of the process. In step S501, the monitor 50 turns the transceiver 55 on. In configurations where the transceiver is already on, such as because the transceiver is always kept on, this step can be omitted. In step S502, the monitor 50 observes a wireless signal. On observation of a wireless signal, the process moves to step S503 in which the monitor 50 determines whether the observed signal satisfies a control criterion. If the control criterion is not satisfied the process does not continue to step S504. In this case the process can terminate, or the process can skip to step S505 in which the monitor 50 turns the transceiver off. In configurations where the transceiver is to be kept on, such as because it is always kept on, step S505 can be omitted. If the control criterion is satisfied, the process continues to step S504 in which the monitor 50 transmits a signal to effect a change of state of the building system. The process can terminate here, or it can continue to step S505 if desired.

In some implementations, a setup procedure to set up the monitor 50 can be run. The setup procedure can be run periodically. The monitor 50 can be turned on. This can cause the monitor 50 to initialise its hardware and device drivers for networks via which it is to observe signals and via which it is to effect control. In one example the monitor 50 observes a Wi-Fi network, and effects control via a Z-Wave network. In other words, the monitor 50 is configured to observe Wi-Fi signals, and the monitor 50 is configured transmit a control signal via the Z-Wave protocol (i.e. to communicate with either or both of the building system interface 70 and the building device 82 via Z-Wave). In some examples the system can listen on Wi-Fi and Bluetooth for devices indicating occupancy, and may connect to a subsidiary environment sensor (or e.g. a lighting control system) via the same Bluetooth radio. The system may provide data to a Building Management System via a wired network connection. The system may connect to a web platform via a wired or cellular network, or via intermittent use of the Wi-Fi (e.g. the system can stop monitoring briefly to send data). The web platform may allow data to be accessed by a BMS (perhaps by a subsidiary device) for control.

The monitor can be configured to run the setup procedure automatically, and/or in response to input such as user input. An automatic setup might be followed by a user setup. Automatic setup can be performed on the basis of the strength of the received signals, the network name, and/or the hardware address of the received signals. Thus the monitor can be automatically configured to observe on channels/frequencies selected in dependence on one or more of these criteria. This is discussed below.

Other examples of networks that the monitor 50 can utilise to effect control include Zigbee, Thread, DALI, DyNet, RF, InfraRed, Bluetooth, a wired interface, BACnet/IP, and control of networked/Wi-Fi devices.

Figure 6:
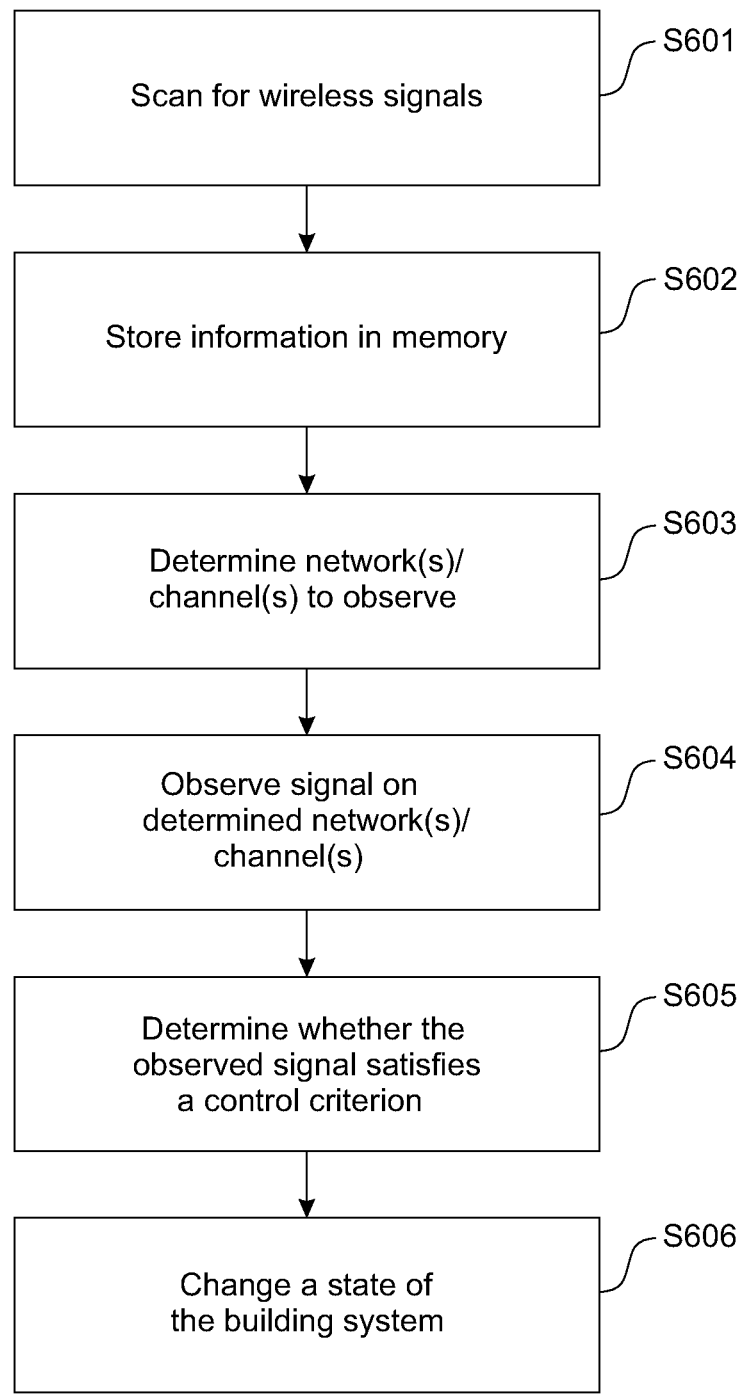
FIG. 6 illustrates another process of using the monitor.

A process of identifying networks and/or channels to observe will now be described with reference to FIG. 6. The monitor 50 identifies Wi-Fi networks to monitor by scanning all available channels for Wi-Fi beacon packets from access points (step S601). The monitor records the received signal strength (where available) and network information in respect of observed beacon packets. The recorded information is suitably stored in the monitor memory 58 (step S602). Additionally or alternatively, the recorded information is suitably stored in a remote memory location, for example at a remote server. The monitor is configured to select a network to observe (step S603). Suitably this is done in dependence on the received signal strength of the beacon packets. E.g. the monitor 50 will observe on the strongest network. Suitably the monitor 50 is configured to observe on networks that it determines are associated with the strongest network. Such a determination can be made on the basis of the SSID of the network (for example a 2.4 GHz network and a 5 GHz network with the same SSID) or networks observed via the same access point (potentially with differing SSIDs).

A 2.4 GHz network signal and a 5 GHz network signal sent from the same access point might have different received signal strengths. This can be due to propagation losses and/or differences in the receiving hardware. Typically the strengths of these signals are not very different. For example, the signals might differ in received strength by less than about 12 dB. For example, 2.4 GHz signals might differ by 6 dB or less, and 5 GHz signals might differ by 12 dB or less. Signals on 2.4 GHz networks with differing SSIDs can be determined to be observed via the same access point if the received signal strengths of the signals are within 6 dB, or preferably within 3 dB, of each other. Signals on 5 GHz networks with differing SSIDs can be determined to be observed via the same access point if the received signal strengths of the signals are within 12 dB, or preferably within 9 dB, of each other. The tolerance of this determination, i.e. the difference in relative strengths between networks, can be chosen in dependence on signal propagation or signal attenuation near the access points. For example, in an open space, there may be less difference in signal strengths between signals. Thus different networks may be determined to be observed via the same access point if the signal strengths are within, say, 6 dB of each other. In a space with many structural features such as walls or stairwells that cause relatively stronger signal attenuation, there may be a relatively greater difference in signal strengths between signals. Thus different networks may be determined to be observed via the same access point if the signal strengths are within, say, 9 dB of each other. This approach permits the determination to be made consistently despite fluctuations in the signal strengths. Networks with differing SSIDs can be determined to be observed via the same access point if they are observed on the same channel (though since 2.4 GHz networks and 5 GHz networks will be observed on different channels, this applies to 2.4 GHz networks and 5 GHz networks separately).

Signals may not necessarily comprise SSID/BSSID information. It is useful to determine the hardware addresses of the networks. Typically a hardware address will comprise 12 hexadecimal characters, which can be split into pairs (for example xx:xx:xx:xx:xx:xx). A portion of these characters may be associated with a manufacturer (and so might be used to determine whether the device belongs on one or other of the 'positive' or 'negative' lists discussed above). Addresses of networks on the same access point may differ by up to 4 characters. Therefore it is possible to determine that observed networks are on the same access point where the addresses are similar, i.e. where the addresses differ by fewer than four characters (or two pairs of characters), or preferably fewer than two characters (or one pair of characters).

In one example, a monitor is configured to observe signals, and to determine a signal with a particular characteristic, such as the highest received signal strength. The monitor is then able to determine the hardware address from which that signal was sent, and to observe other signals sent from that hardware address, or a similar hardware address (as determined above).

Any combination of the above approaches to determine whether observed networks are on the same access point is possible.

Thus the monitor 50 is configured to select one or more network to observe in dependence on received signal strength, SSID and access point address information. Additionally or alternatively the network to observe can be selected manually. The user interface 60 can be used by a user to input details of the network to observe, or the user interface 60 or the port 64 can be used to transfer details of the network to observe to the monitor 50.

The monitor 50 may be configured to periodically re-scan to enable automatic detection of changes in Wi-Fi setup.

In some examples, in a building with multiple access points with the same SSID and multiple monitors positioned throughout the region of interest, a comparison can be made between signal strengths received from each access point by different monitors to determine which access points are closest to which monitors. This can be used to determine which access points to listen to for full coverage of all the access points in the region of interest. E.g. each monitor may be configured to listen to the closest access points (for example the closest two or three access points) to ensure full coverage.

In dependence on the selected network or networks to be observed, the monitor 50 sets the transceiver to the appropriate channel or channels. If only one network is to be observed, or multiple networks on the same channel are to be observed, the transceiver observes only the appropriate channel (step S604). If multiple networks are to be observed, on different channels, the monitor 50 causes the transceiver to switch between the relevant channels so as to be able to observe on each of the relevant channels. The monitor 50 is able to function adequately, i.e. to determine occupancy or use of a building in dependence on observed signals, even if only a fraction of suitable packets are observed (as discussed in more detail below). A packet may be deemed suitable if it is sent from an electronic device to an access point identified as an access point of interest, i.e. one that should be monitored, and where the packet comprises the address of the transmitting electronic device. Thus this channel switching, which will reduce the time available for the transceiver to observe each particular channel, is acceptable. In some examples the monitor 50 comprises multiple transceivers, for example multiple Wi-Fi chips, configured to observe on different channels. This arrangement will increase the time available for the monitor 50 to observe any given channel, and so lead to a more complete observation of packets sent over that channel.

At step S605 the monitor determines whether an observed signal on the one or more channel satisfies the control criterion. If it does, then at step S606 the monitor 50 transmits a signal to effect a change of state of the building system.

Suitably, the monitor 50 is able to function adequately when it is able to only observe a fraction of packets sent over a network. Whilst it may be preferable to capture every packet to ensure that the monitor 50 is able to determine occupancy and/or use of the building with the greatest accuracy and/or with a minimum delay, this may not always be possible. In practice, the electronic devices will communicate over the network often enough that if some of the packets are missed, another packet can be observed at a later time, if the monitor 50 observes the network or channel for a long enough period. In practice, an electronic device will usually transmit packets in a burst of a plurality of packets. More than one burst will usually be sent in a typical period in which the monitor observes the network. Thus it is likely that at least one packet will be observed. This may be sufficient to permit the monitor 50 to determine whether the observed signal satisfies the predetermined control criterion.

To take a specific example, three access points can be provided on different Wi-Fi channels on the same network. Observing on all three means that, due to the time taken to switch between the channels, each channel is being observed for less than one third of the time. Some events may be missed, but over a period of time, which can be from about a minute or so to about 10 minutes, all relevant electronic devices on the network can be detected, i.e. packets from the electronic devices can be observed. It is noted that in this situation the monitor is observing packets from the electronic devices, rather than from the access point, for example. Thus, assuming that there are equal numbers of packets sent to each electronic device as there are sent from each electronic device, and that there will also be beacon packets transmitted by the access point, the observed packets on each channel considered by the monitor represent less than one third (because there are three channels) of less than one half (because the monitor is only considering signals sent from the electronic device) of total non-beacon packets. Even with this reduced amount, the approach described herein can be effective.

Time taken to process an observed packet may mean that the transceiver is not able to observe a subsequent packet for a short time after initially observing the packet. This can mean that some following packets are not observed. In a case where packets are sent in a burst, it will usually be sufficient to observe the first packet (or one packet) of the burst. It is not necessary to observe all packets sent in the burst. Thus the present approach is able to accommodate delays in software processing of packets.

When observing Bluetooth packets, it is not necessary in all examples to observe on a particular channel.

The system has been described above in the context of controlling lighting and heating systems, amongst others. In some examples the state of the building system can comprise security settings, for example the state of one or more door lock. Where an electronic device is associated with a given person, for example the occupant of an office, determining the presence of that electronic device may cause the monitor 50 to unlock the door of the office. Thus the occupant will be able to conveniently enter their office without needing to possess or use an entry card or key. When the occupant has left their office, the monitor may determine that the electronic device is no longer present and, in response, cause the door to be locked automatically. In some situations the door may additionally be locked another way. Thus the automated door system can provide an additional layer of security.

It is possible for a single electronic device to be associated with a particular person. On the detection of the presence of that electronic device, the monitor can effect control of the building system in accordance with a profile associated with that person. This can, for example, include any one or more of unlocking selected doors, turning selected lights on, and setting the heating or cooling units to a selected temperature. The profile is suitably configurable, such as software configurable. The profile may be configurable by a user.

In some examples more than one electronic device can be associated with a person. The monitor may effect control of the building system in response to sensing the presence of any one, or of a predetermined combination, of those electronic devices.

The monitor 50 may be configured to determine the class of an electronic device. For example, determination of a wearable electronic device can permit enhancement of the link between that device and a person which can increase the accuracy with which the system determines the presence of that person. Such increased accuracy may be particularly useful in the context of security applications. This may be because a higher level of confidence that a particular person is present is required. The electronic device can be determined to be a wearable electronic device in dependence on the address such as the hardware address of the device, by user definition and/or in dependence on the variation in the signal strength of the signals observed from that device. Hardware addresses of devices can be entered and/or stored as described above in the context of printers and other such peripherals. In one example, a non-wearable device may be brought into an office, left there in the morning, taken out at lunchtime, left in the office in the afternoon and taken out in the evening. A wearable device might be brought into the office, but then be taken out many times in the course of a morning and/or afternoon. Thus a wearable electronic device may generate a different signal strength profile over the course of a day (or any other suitable time period) compared to a non-wearable device.

The monitor (or network of monitors) is suitably configured to use different networks for different purposes. For example, the monitor might use one network for observations, another network for outputting control signals, and another network for configuration of the monitor itself (or other monitors). The monitor can be configured to communicate over a plurality of networks using one or more radio, such as a transceiver. The monitor suitably comprises a different radio, such as a transceiver, for communicating over each network.

Whilst the system has been described herein in the context of an office building, examples of systems described herein are effective in other buildings or in other areas, including other types of commercial buildings (including hotels, airports, retail parks, shops and so on), houses, gardens, sports centres, boats (e.g. ferries, cruise liners as well as smaller boats) and so on. Examples of systems described herein are also effective in temporary structures such as marquees. Example systems can also be used at transport locations, such as train and/or bus stations or stops, and/or ports or marinas. Example systems can also be used at streetlight locations, to increase the lighting level for safety when an electronic device is observed in the proximity or region of the lamppost, for example.

The system also has applications in large venues, such as conference venues and auditoriums. In such venues, known sensing systems such as passive infra-red motion sensors may not provide adequate sensing capabilities due, in part, to the distance between such sensors and parts of the area to be sensed in many such venues. Motion sensors can also be time-consuming and/or difficult to install. The present system can utilise an appropriate wireless network, such as one with a suitable range, to ensure that electronic devices in all regions of the venue can be observed. This can be done using fewer installed parts (such as monitors) than other systems.

The present system can be used independently of other presence detection technologies, such as motion sensors and ambient light sensors, or it can be integrated with other presence detection technologies. Such integration can provide the system with additional information and aid learning usage patterns.

The techniques above permit control of building devices, including powered systems, based on presence sensing, such as Wi-Fi presence sensing. This permits the energy consumption of the building devices and/or powered systems to be regulated and potentially reduced. This also permits the improvement of indoor air quality and consequently improvements to people's health and wellbeing.

The monitor 50 can store information associated with the control signals that it outputs. This information can be stored in the monitor memory 58. This information can be stored separately from the monitor 50, for example at a computer connected to the monitor over a network. This information can comprise energy usage data associated with the building devices. The energy usage data can be obtained from a power meter coupled to the building device and/or estimated from knowledge of the building device power and times at which the building device is powered on and off. The building system interface 70 may be configured to determine energy usage data, for example by comprising power metering capability. This enables determination of an energy profile of separate building devices and/or the building system.

The monitor 50 can store occupancy and/or network usage data, such as Wi-Fi usage data. This data can be stored in the monitor memory 58 and/or stored separately from the monitor 50, such as at a remote computer. Recording this data can allow reporting of peak hours, occupancy, usage levels and so on, on a per device, per user or on an average basis. This information can, for example, be used for behavioural analysis for improving workspace efficiency, analysis of employee working habits, clocking in and out of employees, monitoring department needs and/or use by an external monitoring or analysis entity.

The monitor 50 and/or the building system can be connected to a server, for example via the internet. The connection can be made via the local or network interface on the monitor. This can permit access to the monitor memory 58 and/or the remote computer storing usage data via an external web portal or a mobile app, in addition to permitting user interactions and configuration via the user interface 60. This therefore permits remote, as well as local, configuration of the monitor 50. The remote computer may comprise the server.

In systems employing the techniques described herein, manual control of the building devices can be maintained, for example via a switch. Manual control can be maintained as an override. The monitor 50 is suitably able to monitor for manual operation of the switch. On detection of manual operation of the switch, the monitor 50 is suitably configured to alter the control of the relevant building device. This can include enabling a permanent off mode (i.e. until the switch is again manually operated) or providing for a longer timeout period after manually turning a switch on.

The system suitably provides for an automatic fail-safe for specific conditions, such as a shutdown of the network, for example the Wi-Fi network. In this case the building devices suitably return to normal switch behaviour or other pre-configured behaviour.

Due to the use of wireless networks, such as Wi-Fi, the present system is effective with one monitor, or a low number of monitors. This makes the installation, configuration and maintenance of the system much easier than for other systems. This also means that the system is particularly suited to environments such as older buildings where the system is able to be easily and cost-effectively retro-fitted into the building. This provides an effective way of providing energy management services at low cost even for older buildings.

As a result of leveraging the existing infrastructure, for example the wireless network infrastructure, within a building, such as the Wi-Fi networks, the present system is less costly to install and operate.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A building monitor for controlling an environment in a region of a building, the monitor being configured to couple to a building system and operable to change a state of a building system, the monitor comprising:
   a processor, and
   a receiver coupled to the processor, the receiver being configured to wirelessly detect the presence of one or more electronic device, by observing a wireless signal over
   a network to which the receiver does not belong, thereby to indicate an occupancy level of the region of the building,
   the processor being configured to:
      determine whether the detected electronic device is indicative of occupancy in dependence on a time-varying characteristic of the wireless signal; and
      receive an environmental signal indicative of an environmental condition in the region of the building;
   the monitor being configured to output a signal for controlling the state of the building system in dependence on the indicated occupancy level and the indicated environmental condition; in which the monitor is configured to output the signal in dependence on a measure of correlation between the occupancy level and the environmental condition;
   in which, where:
      the indicated occupancy level is in a first occupancy band, and
      the indicated environmental condition is in a first environmental condition band, the monitor is configured to control the state of the building system to be in a first building system state; and
      in which the monitor is configured to
      control the state of the building system to be in a second building system state where the indicated occupancy level changes to a second occupancy band; and/or
      control the state of the building system to be in a third building system state where the indicated environmental condition changes to a second environmental condition band.

2. The building monitor according to claim 1, configured to determine a change in at least one of:
   the indicated occupancy level, and
   the indicated environmental condition
   and to control the state of the building system in dependence on the determined change.

3. The building monitor according to claim 1, in which the time-varying characteristic comprises one or more of a received signal strength of the wireless signal, an activity level of the wireless signal and a connectivity profile of the electronic device.

4. The building monitor according to claim 3, in which the activity level of the wireless signal comprises a data rate and/or a packet rate.

5. The building monitor according to claim 3, in which the connectivity profile comprises a binary measure of connectivity.

6. The building monitor according to claim 3, in which the processor is configured to determine that there is a change in signal strength when the signal strength changes by more than one or both of:

a predetermined threshold change; and a predetermined proportion of an observed signal strength.

7. The building monitor according to claim 3, in which the processor is configured to discriminate between different types of electronic device based on the connectivity profile.

8. The building monitor according to claim 7, in which the processor is configured to determine how many different users are present in a given time frame based on the discrimination between different types of electronic device.

9. The building monitor according to claim 1, in which the environmental signal is indicative of a plurality of environmental conditions in the region of the building.

10. The building monitor according to claim 1, in which the environmental signal is indicative of air quality.

11. The building monitor according to claim 1, in which the environmental signal comprises an indication of whether the region of the building is in fluid communication with an external environment.

12. The building monitor according to claim 1, in which the one or more electronic device is associated with the region of the building.

13. The building monitor according to claim 1, in which the processor is configured to output a control signal to the building system to cause a change in the state of the building system.

14. A method of controlling an environment in a region of a building using a building monitor, the method comprising:

- detecting, at a receiver of the building monitor, the presence of one or more electronic device, by observing a wireless signal over a network to which the receiver does not belong, thereby to indicate an occupancy level of the region of the building;
- determining, at a processor of the building monitor, whether the detected electronic device is indicative of occupancy in dependence on a time-varying characteristic of the wireless signal;
- receiving, at the processor of the building monitor, an environmental signal indicative of an environmental condition in the region of the building; and
- outputting, using the building monitor, a signal for controlling a state of a building system in dependence on the indicated occupancy level and the indicated environmental condition; in which the method comprises outputting the signal in dependence on a measure of correlation between the occupancy level and the environmental condition;

in which, where:
- the indicated occupancy level is in a first occupancy band, and
- the indicated environmental condition is in a first environmental condition band, the method further comprising, using the building monitor, controlling the state of the building system to be in a first building system state;
- the method additionally comprising, using the building monitor, one or more of:
- controlling the state of the building system to be in a second building system state where the indicated occupancy level changes to a second occupancy band; and/or
- controlling the state of the building system to be in a third building system state where the indicated environmental condition changes to a second environmental condition band.

15. The method according to claim 14, comprising determining a change in at least one of:

the indicated occupancy level, and the indicated environmental condition and controlling the state of the building system in dependence on the determined change.

16. The method according to claim 14, in which the time-varying characteristic comprises one or more of a received signal strength of the wireless signal, an activity level of the wireless signal and a connectivity profile of the electronic device.

17. The method according to claim 14, in which the activity level of the wireless signal comprises a data rate and/or a packet rate.

18. The method according to claim 14, in which the environmental signal is indicative of a plurality of environmental conditions in the region of the building.

19. A non-transitory computer readable storage medium having stored thereon computer readable instructions that, when executed at a computer system, cause the computer system to perform a method of controlling an environment in a region of a building using a building monitor, the method comprising:

- detecting, at a receiver of the building monitor, the presence of one or more electronic device, by observing a wireless signal over a network to which the receiver does not belong, thereby to indicate an occupancy level of the region of the building;
- determining, at a processor of the building monitor, whether the detected electronic device is indicative of occupancy in dependence on a time-varying characteristic of the wireless signal;
- receiving, at the processor of the building monitor, an environmental signal indicative of an environmental condition in the region of the building; and
- outputting, using the building monitor, a signal for controlling a state of a building system in dependence on the indicated occupancy level and the indicated environmental condition; in which the method comprises outputting the signal in dependence on a measure of correlation between the occupancy level and the environmental condition;

in which, where:
- the indicated occupancy level is in a first occupancy band, and
- the indicated environmental condition is in a first environmental condition band, the method further comprising, using the building monitor, controlling the state of the building system to be in a first building system state;
- the method additionally comprising, using the building monitor, one or more of:
- controlling the state of the building system to be in a second building system state where the indicated occupancy level changes to a second occupancy band; and/or
- controlling the state of the building system to be in a third building system state where the indicated environmental condition changes to a second environmental condition band.

* * * * *